(12) United States Patent
DeAngelis

(10) Patent No.: US 7,523,466 B2
(45) Date of Patent: Apr. 21, 2009

(54) METHOD AND APPARATUS FOR CUSTOMIZING A MARKETING CAMPAIGN SYSTEM USING CLIENT AND SERVER PLUG-IN COMPONENTS

(75) Inventor: Matthew J. DeAngelis, Durham, NH (US)

(73) Assignee: Amdocs Software Systems Ltd., Dublin (IL)

(*) Notice: Subject to any disclaimer, the term of this patent is extended or adjusted under 35 U.S.C. 154(b) by 407 days.

(21) Appl. No.: 10/855,009

(22) Filed: May 27, 2004

(65) Prior Publication Data

US 2005/0065845 A1 Mar. 24, 2005

Related U.S. Application Data

(63) Continuation of application No. 09/248,616, filed on Feb. 11, 1999, now abandoned.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/320; 719/313; 717/105; 717/108; 705/10; 705/35

(58) Field of Classification Search ......... 717/101–123, 717/161–167; 719/310–320, 328–330; 705/10, 705/35
See application file for complete search history.

(56) References Cited

U.S. PATENT DOCUMENTS

| 5,592,543 | A | * | 1/1997 | Smith et al. ............ 379/266.07 |
| 5,721,831 | A | * | 2/1998 | Waits et al. ................ 705/36 R |
| 5,933,645 | A | * | 8/1999 | Wallack ....................... 717/170 |
| 5,950,172 | A | * | 9/1999 | Klingman ..................... 705/26 |
| 6,170,011 | B1 | * | 1/2001 | Macleod Beck et al. .... 709/224 |
| 6,240,441 | B1 | | 5/2001 | Beckett et al. .............. 709/200 |
| 6,311,190 | B1 | * | 10/2001 | Bayer et al. ............... 707/104.1 |
| 6,684,384 | B1 | * | 1/2004 | Bickerton et al. ........... 717/108 |
| 2006/0230064 | A1 | * | 10/2006 | Perkowski ............... 707/104.1 |

* cited by examiner

*Primary Examiner*—Meng-Ai An
*Assistant Examiner*—Diem K Cao
(74) *Attorney, Agent, or Firm*—Zilka-Kotab, PC

(57) ABSTRACT

Method and apparatus are disclosed which permit customization of a marketing campaign system. Client-side plug-in components and server-side plug-in components are provided. The server-side plug-in component and the client-side plug-in component may collaborate. This may be done by operating the server-side plug-in component in response to data input using the client-side plug-in component. Communication may be performed using persistent properties.

18 Claims, 31 Drawing Sheets

METHOD AND APPARATUS FOR CUSTOMIZING A MARKETING CAMPAIGN SYSTEM USING CLIENT AND SERVER PLUG-IN COMPONENTS

CROSS REFERENCE TO RELATED APPLICATIONS

This is a continuation application of application Ser. No. 09/248,616, filed Feb. 11, 1999, now abandoned, which is hereby incorporated by reference into this application in its entirety.

FIELD OF THE INVENTION

The invention relates to customizable marketing campaign systems, and more particularly, to customizing marketing campaign systems using client-side plug-in components and server-side plug-in components.

DISCUSSION OF THE RELATED ART

General purpose computers may include client/server software applications which are partitioned into client and server parts. This partitioning was originally formulated to allow splitting of interface computing (e.g., using a number of clients, each having relatively low computational requirements) and heavier computational (or memory) resources supplied by the server. In modern systems, however, the client and server applications may reside on a single machine or may be on separate machines.

Recently, computers have been programmed based on object models. Such models include JAVA, C++ and other programming languages. These paradigms model data and programs as objects.

One application (of which there are many) which may be run on a computer includes a marketing campaign. Computer automated marketing campaigns are used by many businesses to contact a large number of potential customers in hopes of increasing sales. Because the cost of contacting every person can be prohibitive, some selectivity in determining who to contact may be required. Marketing campaigns are used to target a desired audience and to select specific actions to be made towards the audience. For example, a campaign may involve selecting a number of people to receive a $5.00 off coupon in the mail. The people receiving the coupons are the desired audience and the specific action is the mailing of the $5.00 coupon. A different (although possibly overlapping) set of people may be targeted for telephone solicitations.

Marketing Databases

Computer databases have proliferated in the marketing context. For example, extremely large databases (or "data warehouses") have been generated for marketing data. While this data may be easy to gather (in some applications), using the information to achieve a goal, such as conducting a marketing campaign to increase sales, can be challenging.

A database may be thought of as including one or more tables, with rows of the table corresponding to individual records in the database. For example, in the database 13 of FIG. 1, a first row 19a indicates the labels for fields of table 15. The term "table" refers to any group of associated records, whether stored in actual table format or otherwise. In this example, each of the rows 19b-19e is an individual record corresponding to an individual person. The term "record" includes any associated set of fields (e.g. the fields in row 19b of FIG. 1) without regard to how it is stored. Thus, in row 19b, a person has a name "1" (column 17a), an age of 65 (column 17b), and an income of $60,000 (column 17c). The database may be built using a great variety of information for each corresponding component or record of the database. For example, in a database in which the records correspond to individuals, the individual's age, address, and income may be readily available information for input to the database. These individual fields, however, may not be meaningful for determining any action in the future. For example, if a business wishes to send out a targeted mailing, the business would like to estimate which of the records in a database of individuals corresponds to individuals who are likely to respond favorably to the targeted mailing. Simple analysis of the available fields in the database (e.g., age, income, and others) may not be sufficient to perform this task.

Accordingly, a number of techniques have been developed for manipulating the known fields (i.e., the characteristics recorded in the database, corresponding to the columns 17a-17c, i.e., name, age, and income) to determine a new characteristic (e.g., field) that is more meaningful. Such techniques include those referred to in the art as "data mining."

Marketing Campaigns and Campaign Management Overview

FIG. 2 illustrates one method of using a customer database to conduct a marketing campaign. The database 20 includes a table 23. The table 23 may be as generally described above, i.e., including a number of individual records corresponding to persons (households, businesses, entities or anything else), e.g., rows 21b-21e, in a number of fields for each record (corresponding to 22a-22d). (While illustrated as a single table 23, this may actually be stored in multiple tables, joined by a key/index to allow access to all of the information.) One or more of the fields may correspond to a characteristic computed according to a model generated through data mining or other technique, e.g. column 22d having a score. The model may be a general method for computing a new value (a score) based on one or more fields within a record. The model may be applied to a record of the database to compute a probability (or other type of statistical analysis) or any other numeric or alphanumeric result.

The table 23 may be provided to a campaign manager 24. The purpose of campaign management is to select and categorize the records of the database (e.g., a corresponding row, such as 21b, 21c, 21d or 21e) for a variety of actions to be performed (or create a "segment" or segments of the database for action).

In one embodiment, individual records (e.g., potential customers) may be selected for one or more of actions 26a-26d. For example, action 1 26a may correspond to sending a person a coupon through the mail. Action 2 26b may correspond to making a telephone call to the individual. Action 3 26c could be storing the record in a history log.

In this example, the purpose of the campaign manager would be to determine which of the records 31b-31e should be sent to which of the action items 26a-26d. Thus, based on the selection criteria, person "1" (row 21b) may receive a coupon through the mail, while person "3" (row 21d) receives the telephone solicitation (e.g., action 2 26b). All of the records may be stored in a promotional log or promotional history table as a part of action 3 26c.

FIGS. 3A and 3B illustrate one way of performing a campaign management process. In FIG. 3A the process begins at a step 30, where a campaign is formed. This corresponds to supplying a table (e.g., 23 of FIG. 2) to a campaign manager (e.g., 24 of FIG. 2). In the corresponding example of FIG. 3B, a campaign process has begun at step 30a.

At step 32, a de-duplication (or "dedupe") may be performed. This step may be best understood with the following step, 34, where queries are performed. A query is an inquiry, in any form, that can be used to classify or sort records. The queries step 34 may involve different ways of defining subsets of records in an input database. Thus, in FIG. 3B, a query 1 34*a* may take all records for persons with an income over thirty thousand dollars. A second query 34*b* may select records of the database that have an income of over twenty five thousand dollars and an age of over 45. In this particular example, a person who is over 45 and has an income of over thirty thousand dollars would satisfy both the first query and the second query. One alternative for handling this is to permit records to follow both paths of the decision tree illustrated in FIG. 3B. That is, a record for a person having an age over 45 and an income over thirty thousand dollars would follow the analysis proceeding from both steps 34*a* and 34*b* of FIG. 3B.

An alternative, however, is to require that each record in the database follow at most only one of the branches corresponding to the queries 34*a* and 34*b*. In this way, duplication of the records is avoided in the query process. Here, the dedupe step 32*a* may identify all of the persons satisfying the first query 34*a* and process those records according to only that branch of the decision tree. Those records (and only those records) that do not satisfy the first query 34*a* would then be tested under the second query 34*b*. In effect, therefore, the second query 34*b* would only include records with fields having an income of more than twenty five thousand dollars per year but less than (or equal to) thirty thousand dollars per year and an age of over 45.

After the query stage 34, a split step may be performed. In the split step, the records that satisfy any applicable preceding query or queries may be divided. The division may, for example, be a random division based on percentage. Thus, at step 36*a* of FIG. 3B, a random 95% to 5% split is performed. At step 36*b*, no split is effectively performed—all of the records satisfying the second query at 34*b* are passed along through the step illustrated at 36*b*.

At step 37, the various records of the database have been divided into groups that are ready for action. Thus, for example, at step 37*a*, a first value proposition may be selected to form an offer cell, such as a value proposition of mailing a five dollar coupon and a corresponding offer in the context of this campaign. A "value proposition" refers to any action of a campaign, such as the mailing of a coupon or a telephone solicitation. Accordingly, any record passed to step 37*a* would be selected for the mailing of a five dollar coupon. At a step 37*b*, an alternative action might be to take no action at all—and any record falling into this class would be assigned a value corresponding to taking no action. Finally, at a step 37*c*, a value of mailing a ten dollar coupon could be assigned (and the record associated with the corresponding offer cell).

After the corresponding values have been assigned, at step 37, an extract step 38 may be performed. According to this step, one or more output files (or tables) may be formed. The output files may be records (or portions of records) associated with the applicable action assigned at the value proposition offer cell step 37. For example, a first extract for 38*a* may be formed in the example of FIG. 3B for providing a file to a mail order house that would arrange for mailing of appropriate coupons. In this case, an output data file could be formed that includes the name, an address field, and the particular value proposition (i.e. mailing a five dollar or ten dollar coupon). This output file could then be provided to the appropriate facility for taking the assigned action.

A second possible extract 38*b* would be to simply log all of the records that were processed through the particular campaign, i.e., form a promotion history log.

The general campaign management process (whether or not corresponding to the particular example described above with reference to FIGS. 3A and 3B), can be implemented using software on a general purpose computer, such as a personal computer.

Campaigns can be built using one or more graphical user interfaces. For example, a graphical interface could permit users to graphically build campaign trees such as the one illustrated in FIG. 3B. Such interfaces are generally known in the art including, as one example, the interface in the VALEX™ program sold by Exchange Applications of Boston, Mass.

In the examples of FIGS. 3A and 3B, the campaign management process has certain identifiable functions for performing campaigns. In the example of FIG. 3A, these basic functions include campaign, deduplication, contact/query, split, value proposition application and extract. Of course, additional and/or different basic campaign management functions could be provided.

Constructing a campaign can involve, therefore, selecting the functional components to construct a campaign and inputting the parameters of the selected components. This can be done using a graphical interface. For example, the blocks representing the components can be selected and connected using a graphical interface. In addition, the parameters for each components can be input using a graphical interface.

FIG. 3C, for example, illustrates one graphical interlace for constructing a query. This interface is available in the VALEX™ program. The screen 39 may be displayed on the screen of a general personal computer, or any other computer. The screen may include a set of fields 31, such as available in conventional software programs. For example, there may be a file field, an edit field, a view field, an options field, a tools field and a help field.

Some or all of the possible commands that can be entered may also have push button interfaces 31*a*. Thus, a new document may be opened or the existing query saved by pressing an applicable button on the tool bar 31*a*.

The interface may include an area for selecting the form of the current query being edited or constructed, as illustrated at 33*a*. The view shown in FIG. 3C, as illustrated at 35, shows a visual form of a query, e.g., a simple form of query examining two fields within a table—age (to be greater than 25) and income (to be greater then thirty thousand dollars per year). An alternative is to show the current query being edited or constructed as a series of SQL (standard query language) statements.

A tool for editing query types 33*b* may also be included. This tool would permit a user to specify the type of record that is being examined in the particular query (or, the type of record selected within a subset generated as the result of the query). For example, the query type may focus on selection of particular customers within a table of customers, as in the example of FIG. 2. Any other possibility could be used for a query type, e.g., transactions, households, or items.

The graphical interface 39 may also include a table selection tool 33*c*. This permits the user to select a table within the user's database for examination. Thus, the user's database may include a number of tables (including redundant or overlapping information and coordinated by a key/index). For example, a database may include a table that includes only customer names and the associated income, while another table may include only customer names and corresponding addresses.

A display area 35 may display the current query being edited or created. Additions or alterations to the current query being edited can be made with a separate pop-up tool bar 35*a*-35*h*. Thus, a cursor marker (not shown) present in the current query 35 may indicate where additional query language commands could be inserted.

One tool 35*a* can be used for generating a comparison between a field of the table being examined and a specified value. One example of a field-operator-value query is shown at 35. The age field of the database is compared with a specified value—"25".

A "field-operator-field" tool 34*b* may be invoked by depressing the button 35*b*. This permits the user to create a comparison of one field of a database with another field, e.g., creating a comparison of the age field and the income field for records within a database.

A "query" tool button 35*c* may permit a user to import a saved query into the present query being edited. A "comment" button 35*d* may permit a user to invoke a comment function that allows the user to make comments related to the query— such as memorializing reasons for the particular structure of the query. An "SQL" button 54*e* may allow a user to input SQL statements as a part of the query being generated 35.

An "and/or" button 35*f* may be used to permit a user to input a Boolean operator such as an "and" statement (such as the one indicated at 35) or an "or" statement. A "not" tool button 35*g* may permit a user to input a "not" statement, corresponding to the Boolean operation "not".

A "group by/having" button 35*h* allows a user to invoke a "group by/having" tool. This button may be used to allow a user to aggregate values within a field for a particular record. For example, if the record corresponds to a customer, the "group by/having" tool may be used to create an aggregation (or average or maximum or minimum, etc.) of all of the purchases that the customer has made. Here, for example, the "group by/having" tool may be used to aggregate the sum of purchases and test whether that sum is more than one thousand dollars.

Similar interfaces may be used to input the parameters of any of the functional components of the marketing campaign.

While the detailed description may describe an embodiment of the present invention that involves implementation of a campaign management program on a client/server architecture, certain aspects of the present inventions have broader applicability. For example, some aspects of the present invention have application far beyond use in campaign management systems. Similarly, other aspects of the invention with respect to campaign management programs have applicability whether implemented on a client/server computer system architecture or otherwise. The context of the examples used in the detailed description is not intended to be limiting, but rather the scope of the invention is defined only by the claims set forth below.

SUMMARY OF THE INVENTION

According to one embodiment of the present invention, a method of customizing a marketing campaign system is disclosed. According to this embodiment, a client-side plug-in component and a server-side plug-in component are provided. The client-side plug-in component is associated with the server-side plug-in component and the server-side plug-in component is operated in response to the client-side plug-in component. According to one example of this embodiment, the client-side plug-in component may permit inputting of information to perform selection of customer records in a database and the server-side plug-in component may actually perform the selection based on the input information.

According to another embodiment of the present invention, a customizable marketing campaign system is disclosed. According to this embodiment, the system includes means for associating a client-side plug-in component with a server-side plug-in component and means for operating the server-side plug-in component in response to the client-side plug-in component.

According to another embodiment of the present invention, a method of customizing a marketing campaign system is disclosed. According to this embodiment, a client-side and server-side plug-in component are provided. This embodiment includes a step of communicating between the client-side plug-in component and the server-side plug-in component using persisted properties.

According to another embodiment of the present invention, a method of customizing a marketing campaign system is disclosed. According to this embodiment, a client-side plug-in component and a server-side plug-in component are provided. The client-side plug-in component is configured into the application. The server-side plug-in component is also configured into the application. After the two are configured into the application, the client-side plug-in component and the server-side plug-in component communicate. The computer system may comprise a client machine and a server machine, with the client-side plug-in component being executed on the client machine and the server-side plug-in component being executed on the server machine.

According to another embodiment of the present invention, a computer readable media for customizing a marketing campaign system is disclosed. According to this embodiment, a client-side plug-in component is stored on the readable media, the client-side plug-in component being adapted to communicate with a server-side plug-in component using persisted properties.

According to another embodiment of the present invention, a computer readable media for customizing a marketing campaign system is disclosed. According to this embodiment, a server-side plug-in component is stored on the readable media, the server-side plug-in component being adapted to operate in response to data provided by a client-side plug-in component.

According to another embodiment of the present invention, a method of customizing a marketing campaign system is disclosed. According to this embodiment, a client-side plug-in component is provided. The client-side plug-in component is configured into the marketing campaign system. The method further includes a step of using the client-side plug-in component to input data for use only by an operation in the original, uncustomized marketing campaign system.

According to another embodiment of the present invention, a customizable marketing campaign computer system is disclosed. According to this embodiment, the system includes means for configuring a client-side plug-in component into the system and means for using the client-side plug-in component to input data for use only by an operation of the original marketing campaign system.

According to another embodiment of the present invention, a method of customizing a marketing campaign system for a computer system is disclosed. According to this embodiment, a plug-in component is provided. The plug-in component is associated with an operation performed by the original application. Access to the plug-in component is provided by incorporating access into an interface component of the original application which is associated with the operation.

According to another embodiment of the present invention, a customizable marketing campaign system is disclosed. According to this embodiment, the system includes means for associating a plug-in component with an operation performed by the original marketing campaign system and means for incorporating the plug-in component into an interface screen of the marketing campaign system which is associated with the operation.

According to another embodiment of the present invention, a method of customizing operations performed by a marketing campaign system is disclosed. According to this embodiment, a plug-in component is provided. A marketing campaign is constructed, the campaign including a specification of a type of operation that is performed by the original marketing campaign system. After the campaign is constructed, it is used to execute a campaign, including a step of executing the plug-in to perform a function for the operation in the original application. According to one embodiment, that function may be pre-processing, post-processing or override processing for the operation. As one example, the operation may be performance of a query to a customer database. A campaign including a query function may be constructed. Rather than using the default or only the default to perform the query operation, however, a plug-in may perform pre-processing, post-processing or override processing for the query.

According to another embodiment of the present invention, a customizable marketing campaign system is disclosed. According to this embodiment, the system includes means for constructing a campaign, the campaign including specification of an operation and means for using the constructed campaign to execute a marketing campaign, the means for using including means for executing the plug-in to perform a function for the operation.

According to another embodiment of the present invention, a computer readable media for customizing a marketing campaign system is disclosed. According to this embodiment, the plug-in component is stored on a readable media and includes code to, perform a function with respect to an original operation in the marketing campaign system.

The various principals and concepts disclosed in the context of a marketing campaign system may have broader application to other systems.

BRIEF DESCRIPTION OF THE DRAWINGS

FIG. 6E illustrates a flowchart of one example of creating a plug-in.

FIG. 6F illustrates a flowchart of one example of implementing a plug-in.

FIG. 10A illustrates one example of an application with a client-side and a server-side plug-in.

DETAILED DESCRIPTION

Figure 1:
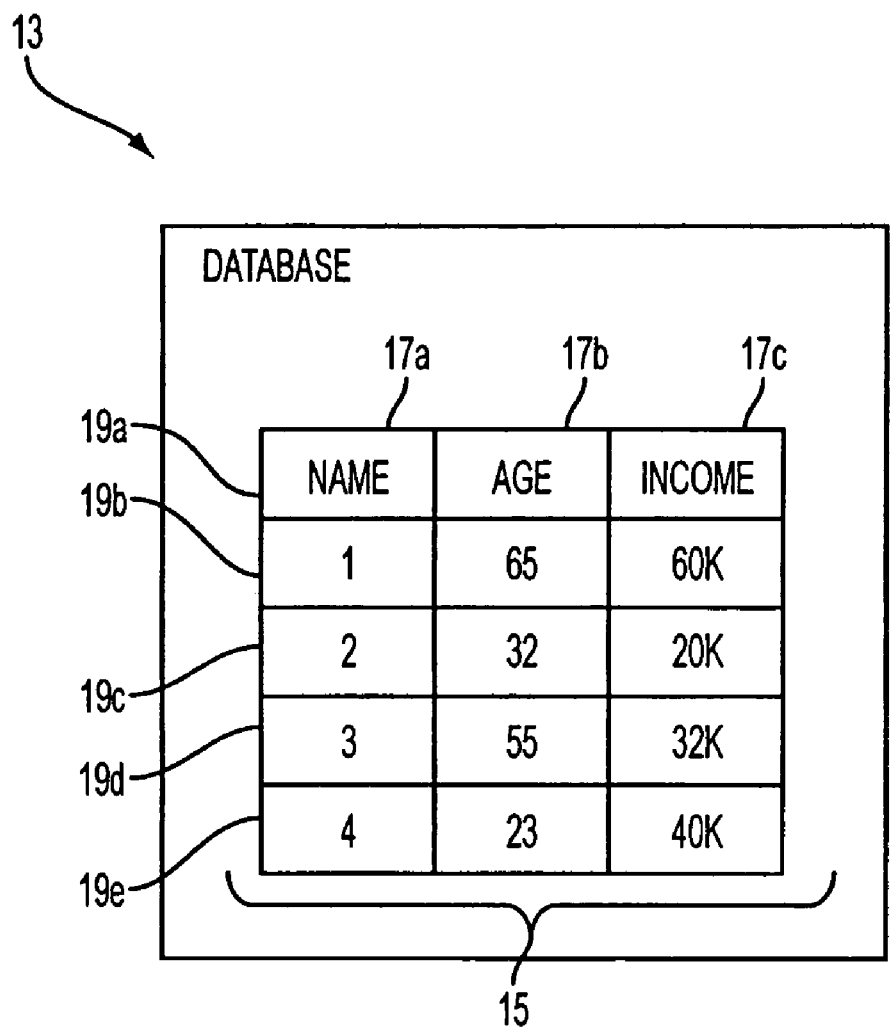
FIG. 1 illustrates an example of a database.
Figure 2:
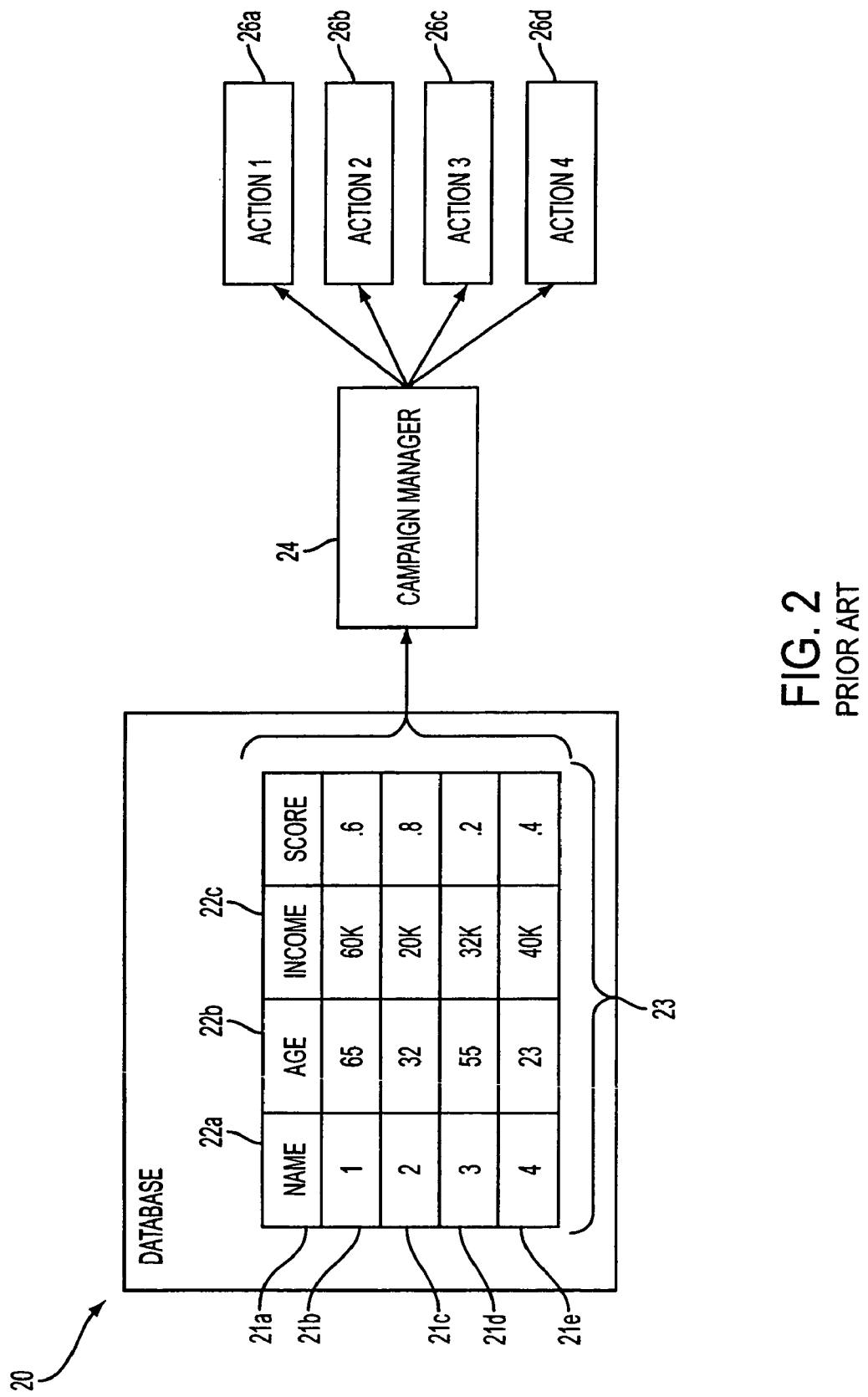
FIG. 2 illustrates an example of a database using a campaign manager to perform campaign management.

It is difficult to provide a computer application that anticipates all of the needs of its users. Accordingly, it may be desirable to permit users to customize the software application. This customization can permit added functionality for the program. Unfortunately, it can often be difficult to provide the ability to permit users to customize the program.

One possible approach to allowing user customization is to permit users to write their own software components, that may be used by the application program during processing. The software component may be programmed in a programming language or a special purpose programming interface for use with the particular application.

Unfortunately, allowing users to program, provide and use plug-in components can be difficult. This is particularly true in the client/server context. According to certain aspects of the invention, a system and method for integrating customized client and server software components is disclosed. According to the system, the components on the client side and the server side may interact during execution of the program.

Whether or not implemented in the client/server context, applications may be implemented using an open object model for the application. According to this model, a data object is constructed that corresponds to a particular task to be performed by the computer application. The object may allow specification of data corresponding to plug-in components. Accordingly, when an object is saved and later retrieved, the retrieved object will include all of the configuration information for any plug-in components used during generation of that object.

This concept can be explained using the example of a campaign management system. A data object corresponding to a marketing campaign can be constructed. (Indeed, the use of a data object to represent a campaign, for use and processing, is useful independent of whether such an object stores or maintains information corresponding to plug-in components.) The campaign may be saved, recalled and edited by saving, recalling and editing the campaign object. When the campaign is executed, the campaign object may be passed to an engine (software on a general purpose computer or otherwise) that processes the campaign.

When the campaign object is built (or during editing), a user may apply, use or configure the various plug-in components. These plug-in components may be tracked and maintained using data stored as a part of the campaign object. By including the plug-in components (or pointers to the plug-in components) in the campaign object, the engine executing the campaign can also appropriately process any tasks requiring a plug-in component. Similarly, if a campaign object is stored and later retrieved, the appropriate plug-in components can be accessed.

Below, an overview of a campaign management system according to the present invention is described. Application of plug-in components to this system in a client/server architecture is then discussed. This includes the mechanisms which may be used in administering plug-in components in a client/server system. Use of business object models in the campaign management context, and including plug-in components, are then detailed.

Campaign Management Systems

A campaign management system is a system that performs the function of campaign management for a marketing campaign by selecting and categorizing records of a marketing database.

A number of campaign management systems are known in the art. One example is the VALEX™ software available from Exchange Applications, LLC, of Boston, Mass. And is described in U.S. Pat. No. 6,240,411B1 entitled "Integrating Campaign Management and Data Mining" by Kurt Thearling and issued on May 29, 2001, which is hereby incorporated by reference in its entirety. Of course, other interfaces and other tools for use within an interface are possible. Other examples include One-by-One, available from Paragren of Reston, Va.; PRIME VANTAGE™, available from Prime Response of Brentford, UK (US: NY, N.Y.); IRE Marketing-Warehouse, available from Harte Hanks of Billerica, Mass.; Quiddity, available from May & Speh of Downers Grove, Ill.; and Epsilon Campaign Manager, available from Epsilon of Burlington, Mass.

A campaign management system may be implemented using a software program implemented on a general purpose computer. Special hardware implementations or hardware component designs may also be used.

A client/server approach to constructing software applications may be adapted to be used to implement a campaign management system according to an embodiment of the present invention. However, other systems may also be implemented as client/server software application and a marketing campaign is used herein only as an example for certain embodiments of the invention.

Figure 4:
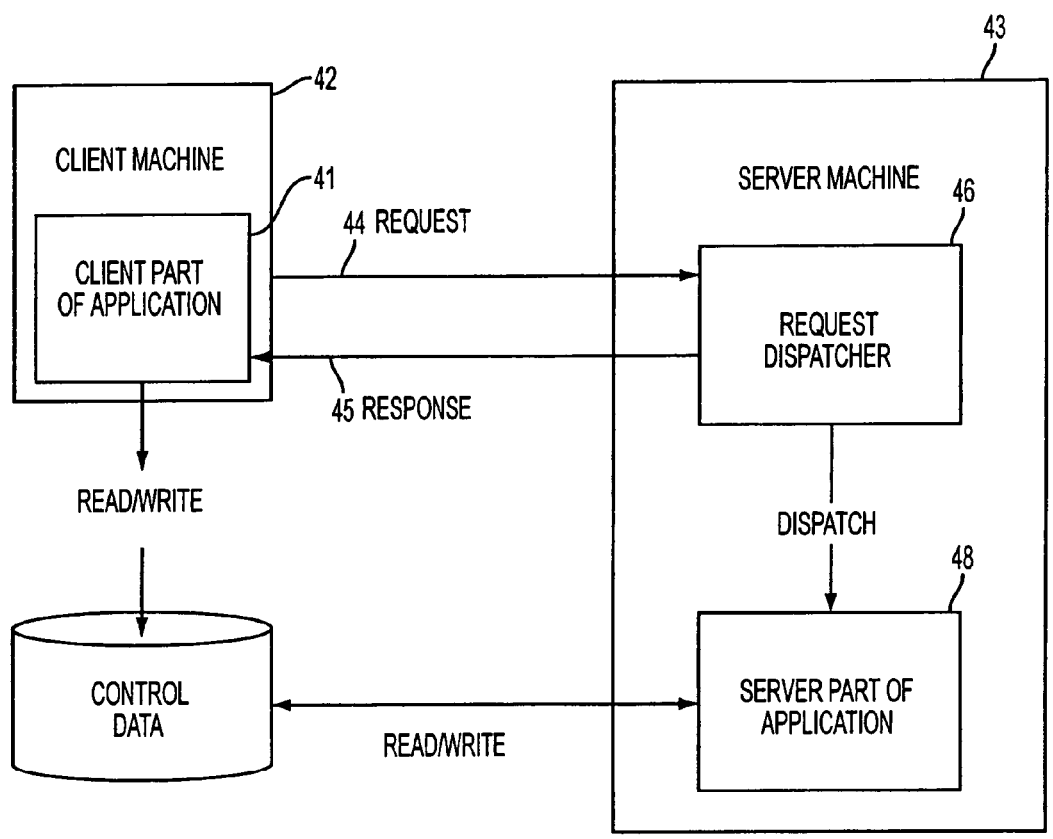
FIG. 4 illustrates one example of client part and a server part of a client/server application.

A client/server software application may be partitioned into a client part 41 and a server part 48 as shown in FIG. 4. The client part 41 and the server part 48 may be on separate machines (e.g., client machine 42 and server machine 43, which may be general purpose computers), but they may also reside on a single machine.

The terms "client" and "server" refer only to roles—a portion of executable software code (client) makes a request of some other executable code (server), so the one is the "client" and the other is the "server". Each part 41, 48 may constitute software running on the applicable machine. In many cases, the client role interfaces with the user while the server performs background execution of request (either processing, retrieval of files, or both) at the request of the client.

An end user may interact directly with the client part 41 through a user interface, which in turn communicates with a server part 48, for example through a request/response mechanism 44/45. In this mechanism, a request 44 to perform some computation is initiated by the end user and the request is interpreted by the client part.

For example, a request in L marketing campaign context may be one of the basic functional components for the particular marketing campaign application described above, such as a query. The client part may handle the input of the campaign by the user, including input of the parameters for each function (e.g., input of a query in a campaign). The client part (or the server part, in other embodiments) may formulate the various requests corresponding to execution of the functions of the campaign (e.g., by formulating a request for a query, followed by a request for a splitter function, etc.). Each request 44 may be transmitted across a computer network by the client part 41 to the server part 48. The server part 48 may then perform a computation based on its interpretation of the request 44.

In some systems, all of the input information used by the server part 48 to process the request is sent over a network as part of a request 44. In other systems, the input information needed by the server part 48 is sent in a separate request according to a protocol between the client part 41 and the server part 48. In some embodiments, a shared memory (or some other mechanism) may be used to pass information from client to server.

When the server part 48 has completed processing the request, a response 45 may be sent back to the client-side (in a similar fashion as the request is communicated to the server part), so that any information created by the server is available to the client and to the user through the user interface at the client machine.

In some embodiments, the request 44 from the client part 41 to the server part 48 is asynchronous such that the client part 41 may receive further input from the end user without waiting for the server part 48 to finish processing the request.

In some embodiments, the client part 41 communicates directly with a server part 48 (e.g., through a direct or "point to point" network connection). In other systems, for example as also shown in FIG. 4, a request 44 from the client part is sent to a request dispatcher 46 which may forward the request 44 to the server part 48. In such a system, a request dispatcher 46 may decide after examining the request 44 which component of server part 48 should receive the request 44 and when it should receive the request. (Of course, the request dispatcher may viewed as a part of the server, particularly if located on the same machine. In alternative embodiments, the request dispatcher may be located on, and a part of, the client-side of the application or some other machine.)

In some systems, a client/server application may include a client, e.g., a personal computer (PC) workstation, which communicates with a server application, e.g., a UNIX system. Either or both of the client and the server may communicate with a third machine to retrieve customer data from a database on the third machine.

An example of a campaign management system implemented using a client/server model is described with reference to FIG. 6C below.

Currently available client/server software applications vary in their ability to be readily extended or changed by parties other than the application vendor. This limits the ability of the user to change the application to accommodate new functions beyond those for which it was originally designed.

One or more plug-in components may be used to extend the functions of an existing application. A plug-in is a software component that is constructed in a manner that follows one or more specified protocols which allow it to be "plugged in" to another (e.g., pre-existing) software application. When "plugged in," the plug-in component becomes available to users who may invoke the plug-in to perform a function.

A plug-in may be written using any standard programming language. In alternative embodiments, a custom language may be provided with a particular software application that permit the software application to interpret (and execute) plug-in components written by third-parties using the custom language.

Generally, the functionality that is provided by a plug-in is not part of the original application. At some point, as the application is being executed, a user communicates that a particular function, available through a plug-in component, should be used. The application transfers control to the plug-in, whereupon the plug-in performs the requested function. After the plug-in function is completed, execution control is transferred back to the original application.

Client-Side Plug-In Components

Figure 5:
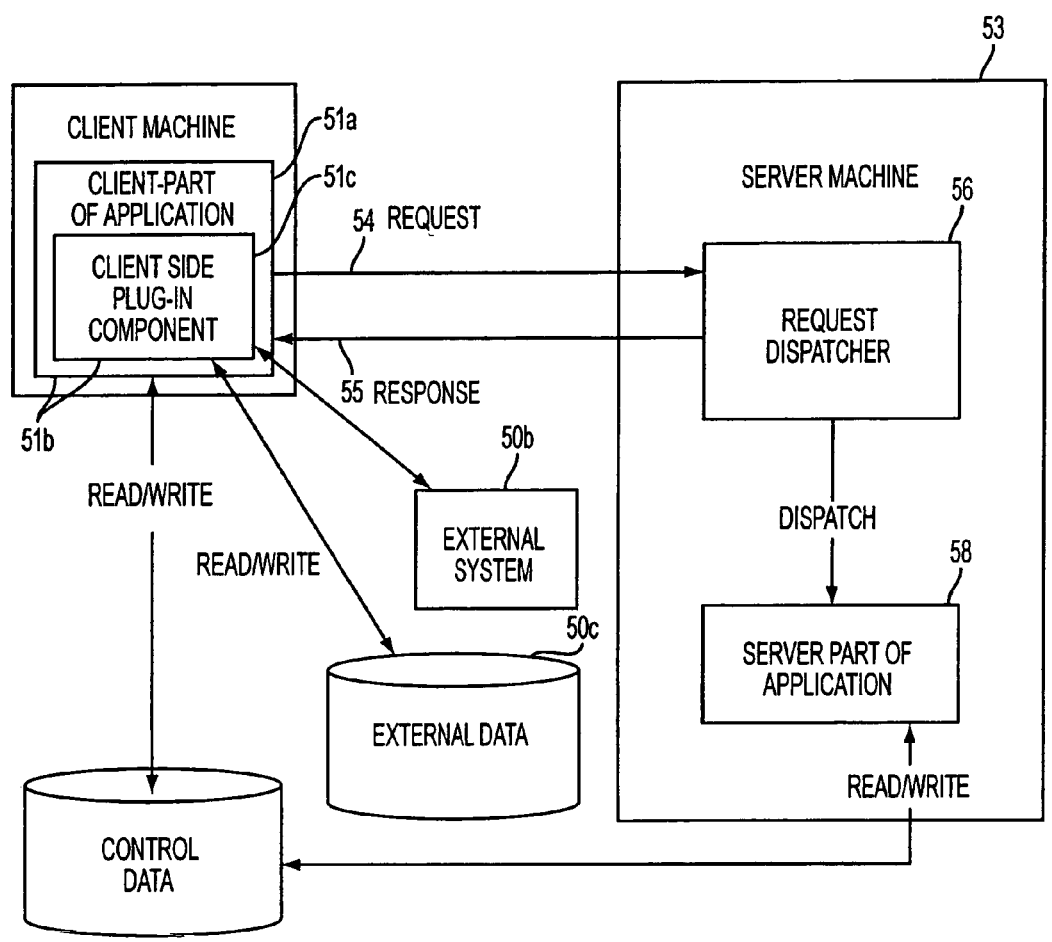
FIG. 5 illustrates one example of an application with a client-side plug-in component.

Some client/server applications may be changed so new functions can be added without requiring the user to replace or upgrade the application. As shown in FIG. 5 for example, one way to add new functions to an application is by installing one or more client-side plug-in software components 51c within the client part of the application 51a on a client machine.

The client part of the application 51a invokes and engages the client-side plug-in component 51c in order to provide some functionality for the user. For example, the client-side plug-in component 51c may read And/or write to external data storage 50c to display information to a user. As another example, the plug-in may provide a new and better way for a user to input data.

Client-side plug-ins may generally be concerned with one of two things. First, they may specify or define how operations should be carried out by a server (with or without input from the user). This may include providing (or permitting input of) parameters or constraints under which the original application process is to operate in order to satisfy a request from a user. For example, a client side plug-in component may present a user with a map of the United States. The map would permit the user to specify a subset of the states of the United States. The plug-in component would then interface with the application program to communicate the users input to the portion of the program which would rely on that input information (such as by adding a corresponding geographical limitation to a query being input by the user).

Second, client-side plug-ins may be responsible for functionality which is "opaque" to the application which contains the plug-ins. For example, the plug-in may generate a report which is otherwise unavailable in the application. Generation of the report is not a part of the original functionality of the program, but may be performed using a plug-in. Another example of a plug-in with "opaque" functionality is a plug-in that permits input of information for use by a server-side plug-in that performs a function not in the original application. For example, a server-side plug-n may be written to permit automatic transfer of extracts over the Internet. A corresponding client-side plug-in may allow a user to configure this function (e.g., enable the function and specify an Internet location to receive the transfer).

When a client part of an application uses a plug-in component to input or formulate input data for use by the application, the plug-in may store the information by writing it in a representational form to permit communication to the server part of the application. The communication may be possible, for example, if the client part of the application (plug-in) places the user information in an agreed upon location (i.e., a file, table, etc.) where the server part can later interpret it and use it to accomplish the process of fulfilling the request. A user (or request dispatcher) may then specify an input (e.g., a request) to the client part of the application in order to perform an action as discussed above in reference to FIG. 4.

For example, after receiving the input from the user, the client part of the application 51a may create a request 54 that is communicated to the server part of the application 58 which is on the server machine 53. The server may then execute the request using the information input using the plug-in component. In general, when the server part 58 is finished computing the requested information, the result of the computation is returned back in the form of a response 55 to the client part of the application 51a. Upon receipt of the response 55, the user is then informed of the completed work and the result. (A request dispatcher 56 may be used as discussed above in reference to FIG. 4, or some other mechanism for invoking commands.)

Thus, a plug-in component may extend the functionality of the original application by using resources beyond what is available to the original application. One example, referred to above, is to provide a map for use by the user in inputting information. The plug-in component may provide the user with a user interface which allows the user the option of selecting a group of customers based on a geographic region. The plug-in component (for example, 51c, FIG. 5) may access its own database (for example, external database 50c, FIG. 5) for information which allows the plug-in component to depict various maps. The plug-in component may also receive updates to the maps through a remote system (for example, 50b, FIG. 5) which the plug-in component may access.

Because a plug-in component increases (or alters) the functionality of the original application, a plug-in may be viewed as a functional extension of the original application. In this example, that functional extension may include accessing separate data in a separate database or even accessing data or other computing resources available on a remote system (such as accessing an updated map by downloading the map over the Internet).

At least one embodiment of a technique to implement and invoke a client-side plug-in component is discussed below.

Server-Side Plug-In Components

Figure 6A:
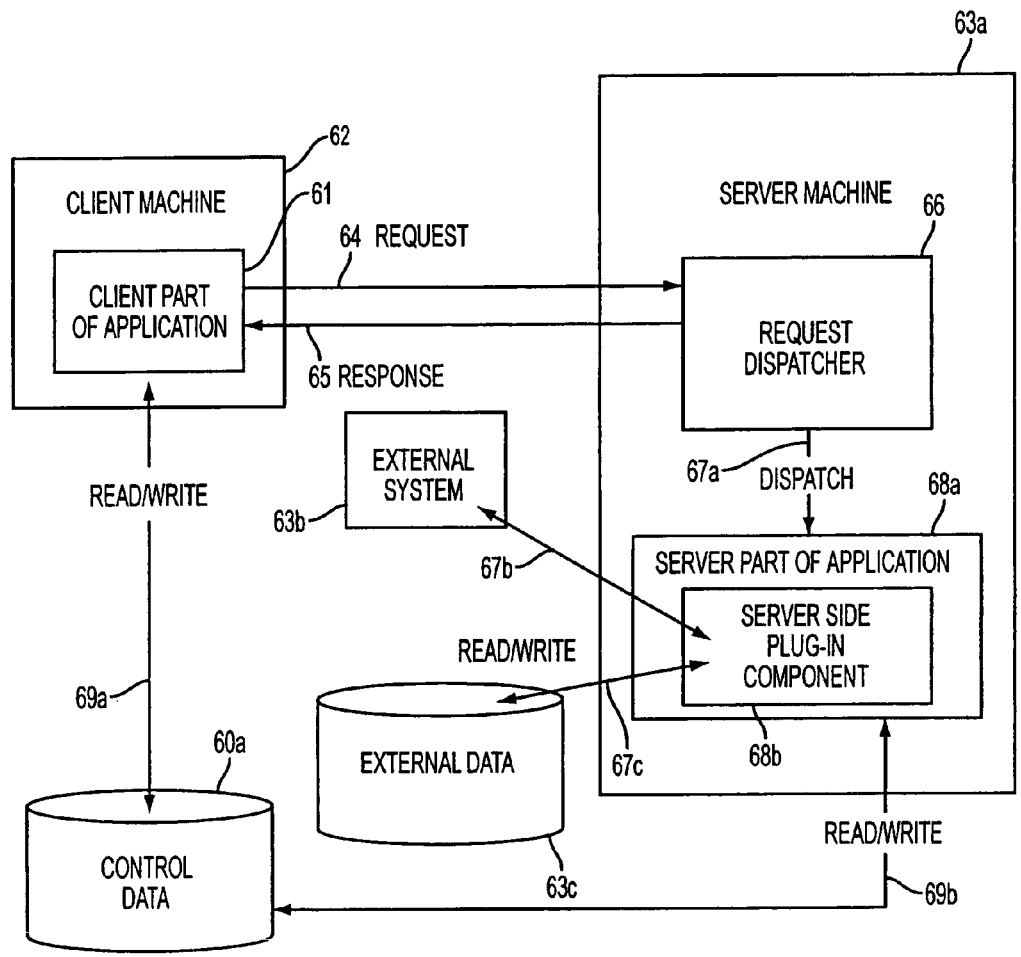
FIG. 6A illustrates one example of an application with a server-side plug-in component.

As shown in FIG. 6A, a server-side plug-in software component 68b may also be installed in a similar fashion to perform a function for the user. Server-side plug-ins may perform fundamental processing functions for the application. Server-side plug-in components may, for example, interpret user-defined criteria and may provide the implementation of the "functionality" made available by the application.

Figure 6B:
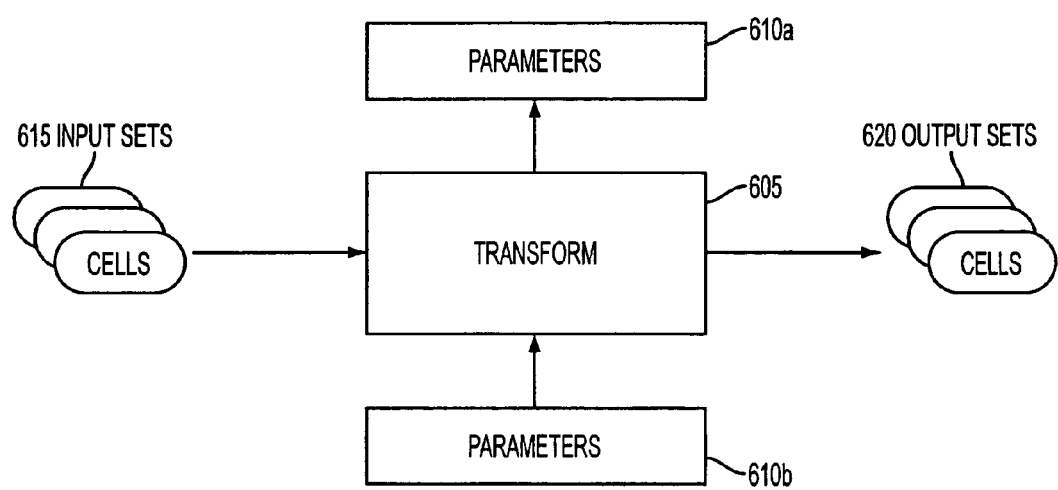
FIG. 6B illustrates an example of a transform operation.

In some contexts, the functions of the program and the server-side plug-in components may be thought of as transformers, an example of which is shown in FIG. 6B. This concept (and the plug-in embodiments described below) are particularly useful in the context of an application which permits a user to specify or input how later execution of the program will occur (although this is not intended as limiting for all embodiments of the invention). For example, in the marketing context, a user may input and edit a campaign and, when finished, schedule execution of the campaign. The same concepts apply, however, for programs that invoke functions immediately when selected by the user.

Transformers perform a transform operation 605 by receiving zero or more input sets of some type (e.g., customers, households, or transactions) 615, interpreting zero or more parameters 610*b* and carry out processing steps to produce zero or more output sets 620. The input parameters 610*b* may influence the manner in which the transform operation 605 is performed. Output parameters 610*a* may also be generated, which are available to a subsequent transform operation.

In the marketing campaign context, some examples of transformers include filters, de-duplicators, consolidators, samplers and extractors, although these are intended as examples only and should not be construed as limiting or exhaustive. For example, a user may choose a sampler transformer. As shown in FIG. 6B, the transformer 605 may receive as an input, for example, a number of customers or households, and the transformer 605 may also receive parameters which are name/value pairs. These parameters may be values which indicate whether the sample should be of a percent or of an exact amount of customers/households. Or, if a user specifies a sample size, for example, 10,000, a parameter may specify whether that value is for the top or bottom 10,000 customers/households in the input set. The transform operation 605 may then perform the sample based on the input set(s) 615 and the parameters 610*b*. The parameters 610*b* that were input, for example, the percentage or sample size would be passed along as parameters 610*a*. In addition, the output value of the transform operation would be provided in output set(s) 620.

Returning to FIG. 6A, a user may ask a client part of the application 61 to perform an action, and the client part in turn creates a request 64 that is communicated to the server part of the application 68*a*. As discussed above, a request dispatcher 66 may receive the request 64 and may forward or dispatch 67*a* the request to a server part of the application 68*a* according to rules of processing which the request dispatcher 66 has been designed to follow. The rules of processing may instruct the dispatcher 66 how to process a request, based on the type of request, to determine which server part of the application will handle the particular request and perform the needed computations.

Figure 6C:
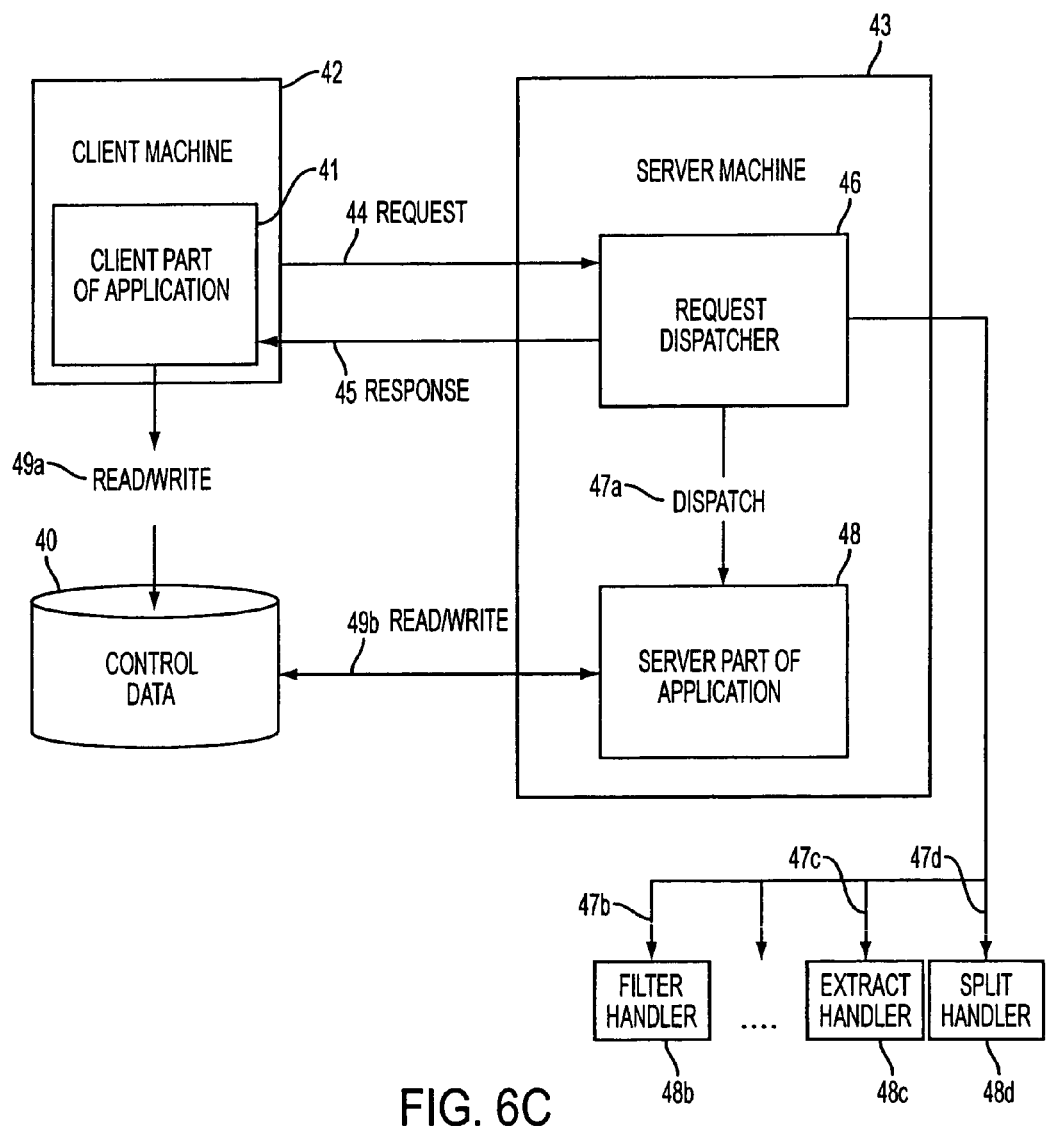
FIG. 6C illustrates an example of a dispatcher processing a request.

FIG. 6C illustrates an example of a request dispatcher 46 in a marketing context which communicates with separate handlers, which may or may not be plug-in components, to process a request 44. This process is described in relation to FIG. 6D.

Figure 6D:
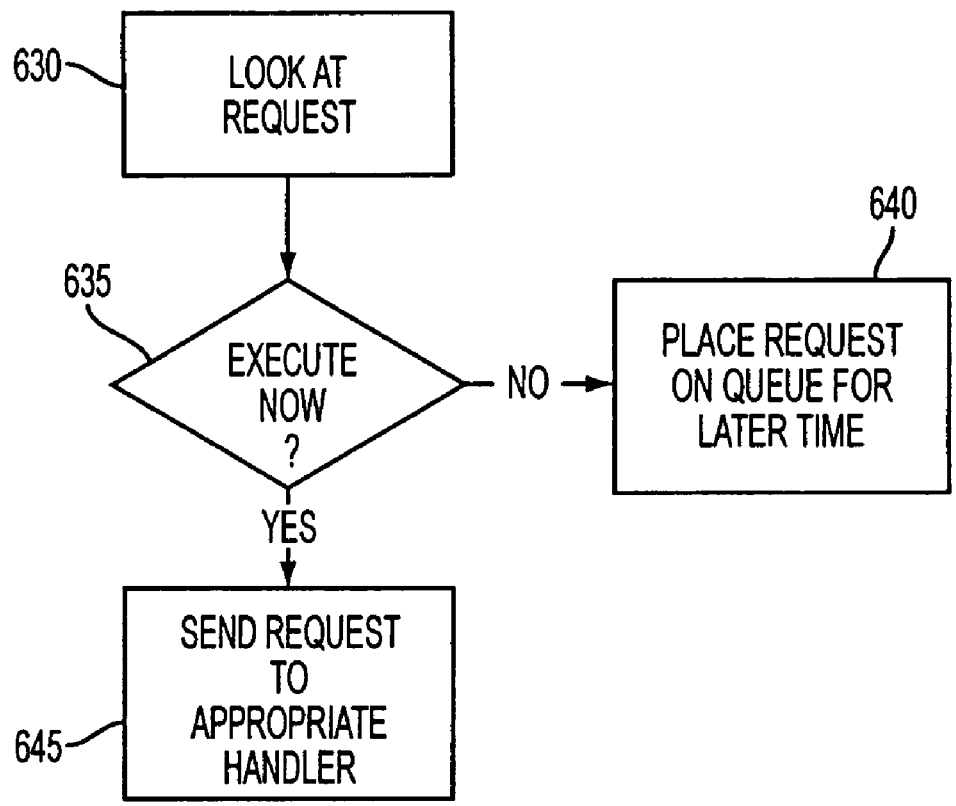
FIG. 6D illustrates a flowchart of a dispatcher processing a request.

FIG. 6D illustrates the general rules of processing which instruct the request 46 dispatcher on how to process a request. In step 630, the dispatcher 66 receives and reviews the request. In step 635, the dispatcher 66 determines whether the request is to be executed immediately or at a later time. If the request is to be executed at a later time, then in step 640, dispatcher places a request on a queue which stores the request for the later specified time. If the dispatcher determines at step 635 that the request should be executed immediately, then in step 645 the dispatcher sends a request to the appropriate handler (48*b*-48*d*, FIG. 6C). For example, if the request is an extraction request, then the extraction handler 48*c* is contacted to process the request. If the dispatcher 66 receives a filter request, then a filter handler 48*b* is called to process the request. FIG. 6C is used as an example only and other rules to instruct a dispatcher on how to process a request may be used. In addition, there may be a variety of handlers to process other user requests.

Server-side plug-in components may be provided which fall into two classes. The first class of server-side plug-in would perform a new function, which is not analogous to an existing function in the application. In the marketing campaign context, for example, a new type of processing of a table could be provided, such as a tool which re-orders records in a table based on zip code (assuming re-ordering records in a table was not provided for in the original application.)

A second class of plug-in may be associated with an existing class of functions (or transformers) in the original application. This association may be made at the time the plug-in is created or at the time that the plug-in is configured in for use by the application.

In the second class of plug-ins, the plug-in may be classified (at the time of creation in one embodiment, or at the time that the plug-in is configured in for use according to another embodiment) as performing pre-processing, post-processing or override-processing for the associated function.

The second class of plug-ins can be sufficient in many contexts, without the first class. Where a new class of functions is to be added using a plug-in, that plug-in may be attached as a pre-processing, override or post-processing step to an existing function. Using the example above in the marketing campaign context, a plug-in that re-orders records in a table can be attached as a pre-processing step before an extract step (which records results from the campaign).

Figure 3A:
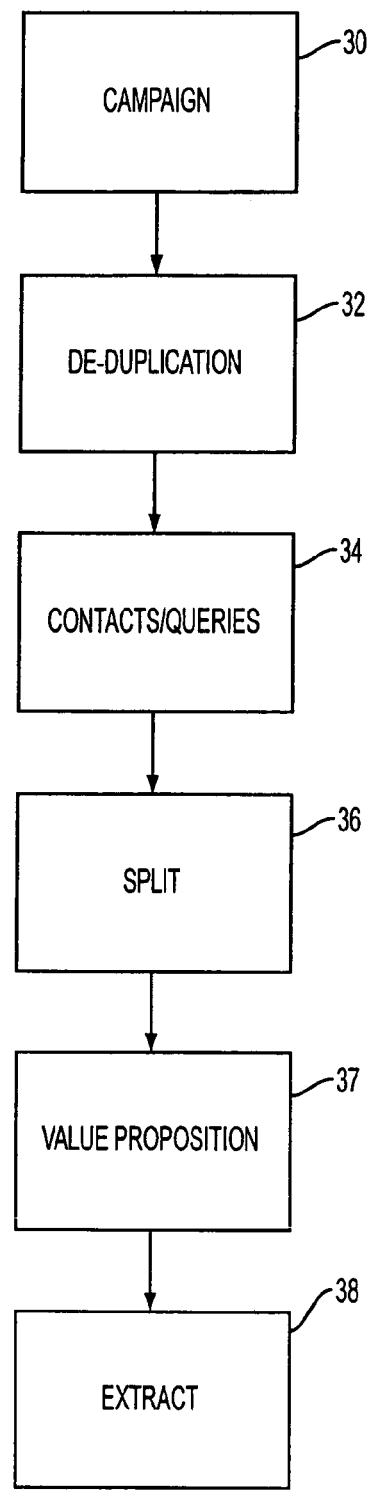
FIG. 3A illustrates one embodiment of a method for performing campaign management.
Figure 3B:
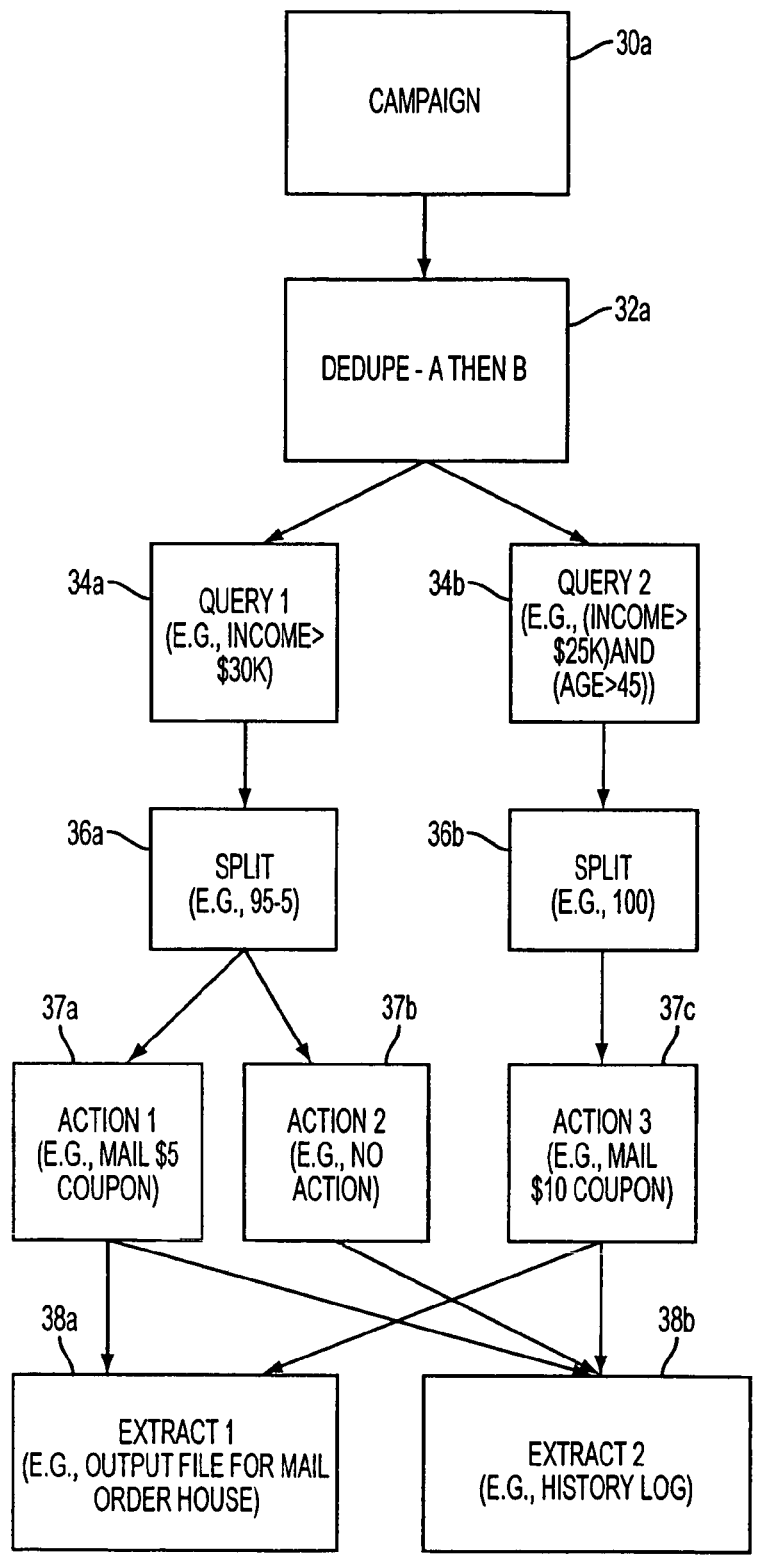
FIG. 3B illustrates an example of campaign management according to the method of FIG. 3A.

Thus, according to one embodiment of the present invention, the server plug-in components may be affiliated with basic operations of the program. For example, in the marketing campaign application described with reference to FIGS. 3A and 3B, six basic functional components were illustrated (although, even in the campaign marketing context, many other or additional functional identifications could be used). The different functions identified in the campaign marketing example of FIGS. 3A and 3B include the overall campaign, deduplication, queries, splitting, value proposition and extracts. According to one embodiment of the present invention, server plug-in components may be associated with these basic processing steps.

According to this embodiment, a server plug-in component may be classified (at time of creation, or at time of configuration) as performing pre-processing, override processing or post-processing. Pre-processing refers to a plug-in component that would execute during normal operation of the application, before the function that it is associated with. For example, referring to FIG. 3B, a pre-processing plug-in component could be associated with the split operation performed at box 36A. The pre-processing function could, for example, further limit the customers for which a split is to be performed. For example, before the split operation 36A, a pre-processing plug-in could further restrict the potential customers to those corresponding records which have addresses in the New England area.

A second type of plug-in performs override processing. In this case, the plug-in would perform an operation that would otherwise be performed by software included with the original application. Again in the campaign marketing context and with reference to FIG. 3B, a user could provide an override function for the split operation 36A. For example, rather than a split operation that performs random splitting (assuming this is all that is provided with the original application), the split could be performed by a plug-in component that ranks individual records within a database in order to perform the split (e.g., taking the 95% of the records that have the greatest age and providing those to the action 1 box 37a and the remaining 5% to the action 2 box 37b.).

A post-processing server plug-in component is similar to a pre-processing plug-in component, but the operation is invoked after the original function of the computer application has been performed. An example of a post-processing plug-in component which extends the function of a client/server application is a ranking server-side plug-in component. For example, in the marketing context discussed above, the server part of the application may perform a process to identify a set of customers (e.g., through a query) for performing marketing functions. In one example, the server-side plug-in component may then perform post-processing functions on the identified customers to calculate the probability for each customer as to whether he/she will stop using a particular banking service. (This new value may then be used later for splitting or sampling the records. By performing this step alter identifying the customer, computational time can be saved as compared to having to compute the probability in advance for all records in the database.) The server-side plug-in component may read/write to external data storage 63c to complete its processing. (Of course, rather than using this plug-in for post-processing on the query, the plug-in could be used for preprocessing for a sampler.)

In sum, a server-side plug-in component 68b which provides post-processing functions may perform additional functions/computations after all other processing steps within the server part of the application have been completed and may operate on the data processed by the server part of the application. A server-side plug-in component may also provide override processing functions which replace processing steps that the server part of the application may otherwise provide. In addition, the server-side plug-in component may provide pre-processing functions by computing/compiling information before other processing steps in the server part of the application.

Figure 6E:
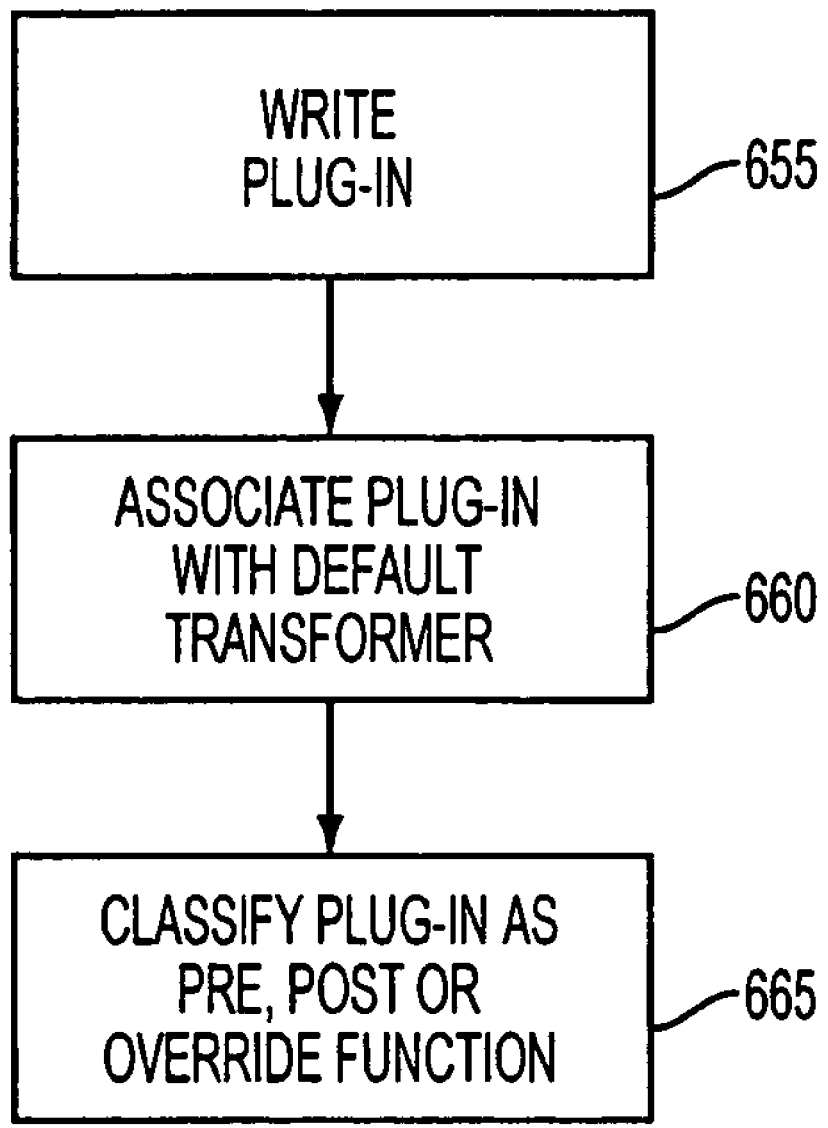

FIG. 6E illustrates one example of a flowchart for creating a server-side plug-in for use according to one embodiment of the present invention. According to this embodiment, the plug-ins are associated with existing functions in the application. In step 655, a programmer may write code for a plug-in based on protocols supplied by a vendor of the application. The protocols may identify, among other things, the formats for available parameters, inputs and outputs of the various functions in the application. For example, a protocol may specify the format of data input to a split operation so that a preprocessing plug-in will be able to accept data received in that format and "intercepted" by the plug-in before being provided to the split operation, and to provide data in the appropriate format to the split operation after pre-processing.

In step 660, once the plug-in is created, it may be associated with a default transformer or function in the existing application. In step 665, the plug-in may be classified as a plug-in for a pre, post, or override function. One example of a method for creating, configuring and adding a plug-in will be discussed in greater detail below.

Figure 6F:
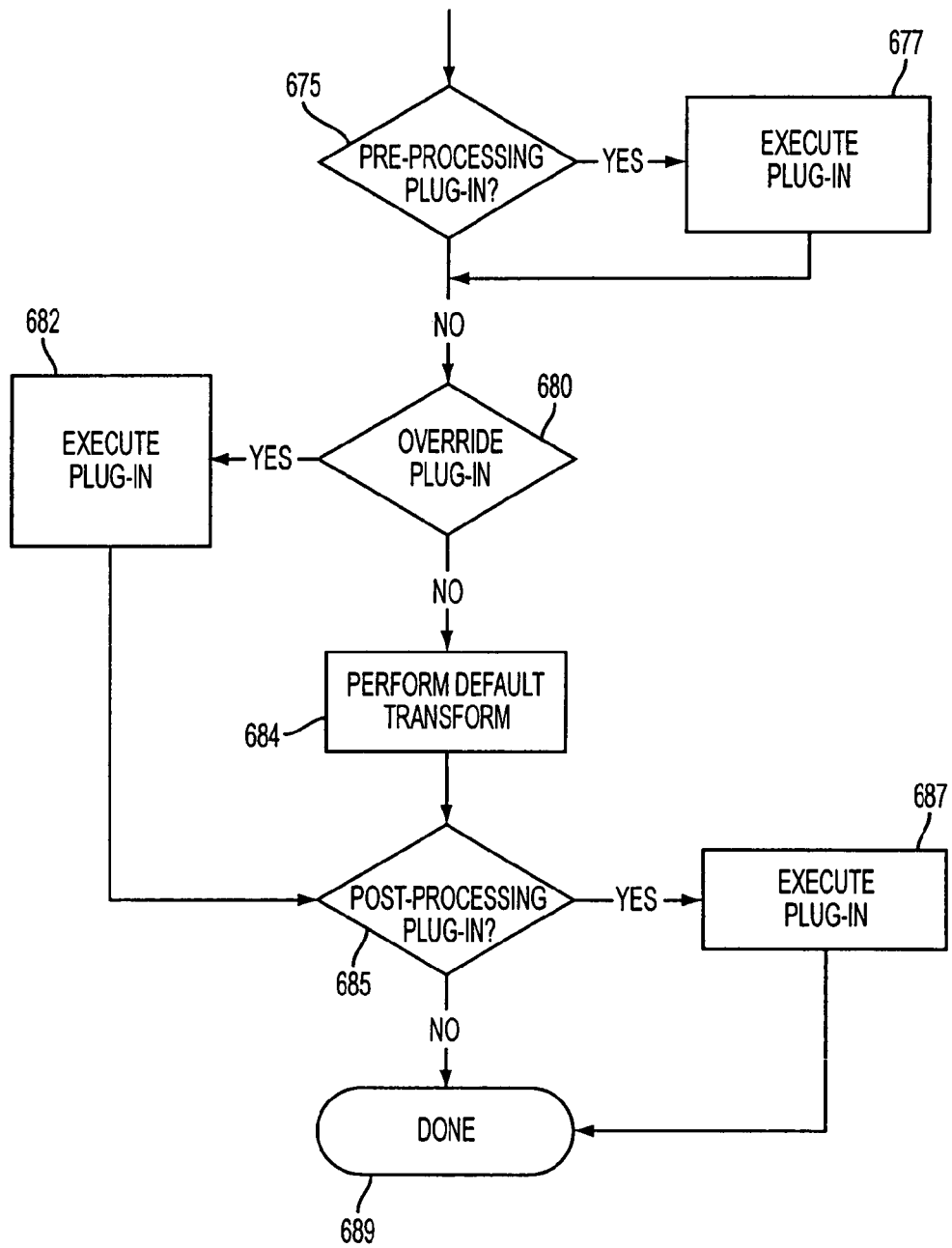

FIG. 6F illustrates one example of a flowchart for using a plug-in component. In FIG. 6F, the server portion of the application has invoked a transformer for the application. For example, an extract process may be invoked for a portion of a campaign management program. At a step 675, it is determined whether any pre-processing plug-ins are associated with this transformer or function. If so, at a step 677, that plug-in is executed. Otherwise, processing continues at a step 680.

At step 680, it is determined whether an override plug-in is associated with this transformer. If so, that plug-in is executed, at a step 682. Otherwise, the default transformer operation is performed, at a step 684.

In both cases, processing continues at a step 685. At step 685, it is determined whether there are any post-processing plug-in components. If so, that plug-in is executed at a step 687. If not, processing is complete at a step 689.

Plug-In Interface.

A client-side or server-side component may or may not have a need to exchange information with the application part that contains, or hosts, the components. If a component needs to exchange information, this may be performed through an object API. That is, the container, or host, provides a method, through a defined protocol, to allow the component to communicate with application objects using their "exposed" interfaces.

Generally, a client-side plug-in component (e.g., 51c, FIG. 5) and the server-side plug-in component (e.g., 68b, FIG. 6A) do not include or use details (other than interfacing information) of the application side that contains them. Coordinating a plug-in component, however, may involve the reading/writing of property values, as well as invoking operations (e.g., member functions), defined as part of the protocol for writing the plug-ins. A named property value is a binding or an assignment association of a named property with a particular value at a particular time. The value of a property at a given time is assigned to that property. At some later time the value of the property may change.

Generally, a protocol is used to allow a client and server part application to access properties found within the API. Many protocols may be used which define a specification or set of rules which govern the interaction between the participants and the protocol. Several protocols which allow software components to be dynamically loaded and activated by a commercial software application include protocols produced for example, by Netscape®, Adobe® PhotoShop®, and OBDC database drivers. However, these applications which use plug-in components do not collaborate and are not administered together for true integration. Instead, each component communicates with its respective application, which in turn communicates through separate protocols to the other application.

In order to create a plug-in, a programmer may need specifications regarding the protocol used by a particular application. Generally, a vendor of an application can provide guidelines and software development tools to facilitate the programming of the plug-in component. A number of techniques in software development tools may be used to facilitate and automate the creation of software components. These development tools may include commercially available products such as Microsoft® Visual Basic®, Microsoft® Visual C++®, Inprise Delphi, PowerSoft(Sybase) Power Builder, PowerSoft (Sybase) JBuilder, Microsoft® Visual J++®, etc. These tools may be used in combination with other skills and other techniques concerned with standard software component interfacing. These additional tools may include Microsoft® Component Object Model Technology (COM), Microsoft® Distributed COM (DCOM) Technology, Remote Procedure Call (RPC), Java Remote Method Invocation (RMI), or Common Object Request Broker (CORBA).

In some instances, a vendor may customize a client/server application software system for an individual customer. However, this creates difficulties in supporting and maintaining the code base for the many clients and types of customized software which results. Vendors that do not customize their systems, on the other hand, are not able to provide additional functionality to their customers until product upgrades are made. Even then, the overall upgraded software may still not meet the requirements of individual customers.

A programmer of a plug-in component may also write code to handle certain events. For example, one event may be that a plug-in is to be notified of a save operation, so that it can perform an operation when it is going to be or has just been saved. However, a programmer may also write code to handle other optional events. For example, a particular plug-in component may want to know when it is opened for the first time so that it can perform a particular set of initialization steps.

The defined protocol may specify other ways a plug-in component can communicate with its host application. Therefore, most plug-ins will have code sections that have the ability to communicate with objects in the application according to an open object application programming interface. For example, a programmer of a plug-in component may want the component to be able to identify the name of the host application. Therefore, the programmer may program the plug-in component so that it may ask the host application for its name by invoking a procedure on an object of the host application.

As discussed above, a user may be provided access to a plug-in component that has been written, for example by a software programmer. Generally, an application may have an administration screen to allow a user to configure, add or delete a plug-in component or its features. Some examples of client plug-ins, as described above, include user interfaces. Some examples of server-side plug-ins may include customized functions, such as a new or override transformer operation.

Custom operations may be installed and configured by the user on the host application through a user interface. A user may associate an application function, such as a transformer operation in the marketing context, with a particular plug-in component. When a user chooses a custom operation, a plug-in component may receive information from the user such as property sets or collections of named property values. These values are passed to the plug-in component when the user request is executed on a server. More details on the operation and administration of plug-in components will be discussed below.

Administering a Client-side Plug-In Component

Figure 7:
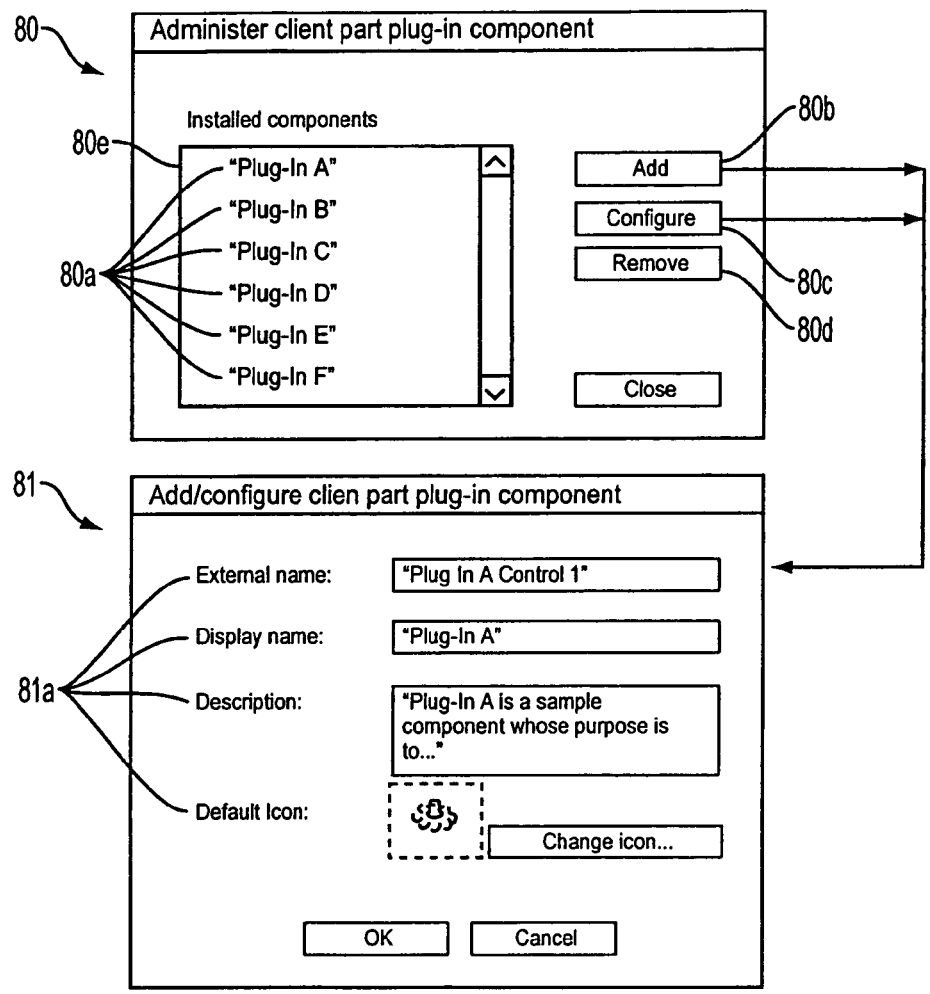
FIG. 7 illustrates one example of a user interface for administering a client-side plug-in component.

FIG. 7 illustrates an example user interface for administering and adding/configuring client-side plug-in components for a client/server application. The depicted interface, or one with similar functionality, may be used in one example, by VALEX™, a program sold by Exchange Applications of Boston, Mass.

Interface screens 80 and 81 shown in FIG. 7 may be displayed on the screen of a general personal computer, or any other computer. Such screens may be invoked in any conventional fashion, such as a button on a tool bar or a pull-down menu.

In this embodiment, interface screen 80 may include a list box interface 80e entitled "Installed components," that displays the set of currently installed and configured client-side plug-in components 80a. These components may be selected to be edited or removed from the client application. For example, if the user wanted to uninstall "Plug-in B", the user may select the second line in the list box 80e and click on the "Remove" button 80d. Some or all of the possible commands in both interface screens 80 and 81 may have push button interfaces such as 80b, 80c, and 80d.

Similarly, a new client-side plug-in component can be added to the application by pressing the "Add" button 80b on the interface screen 80. This action would result in the opening of interface screen 81 entitled "Add/configure client-side plug-in component" and the fields 81a would not yet have a value assigned to them, or they would have some initial value assigned by default from the application. In addition, a previously installed and configured client-side plug-in component could be edited, or have its current configuration modified, by pressing the "Configure" button 80c on the interface screen 80 after selecting an installed component from the list box 80e. This action would result in the opening of interface screen 81 and the fields therein 81a would display values previously assigned to the plug-in component.

Configuring in a client-side component allows a user to access that component in the client side of the application. For example, when a plug-in component permitting input of information using a graphical illustration of the United States is configured into the application, the user must be provided access to the input screens for the plug-in from the client portion of the application.

User access to a client-side plug-in that has been configured into an application can be handled in a variety of ways. Entries in pull-down menus or buttons on tool bars may be added to correspond to the plug-in, when the plug-in is configured in. Where the plug-in is associated with an existing function (such as a plug-in that permits inputting of a query or portion of a query), the applicable method for invoking the plug-in may be provided from that portion of the client interface (e.g., an icon or a screen tab which may be selected from within a query editor screen). Either a user (when configuring in the plug-in) or the provider of the plug-in may input where the plug-in may be accessible from.

An example of a client-side plug-in component which has been configured into the application is described below.

Administering a Server-Side Plug-In Component

Figure 8:
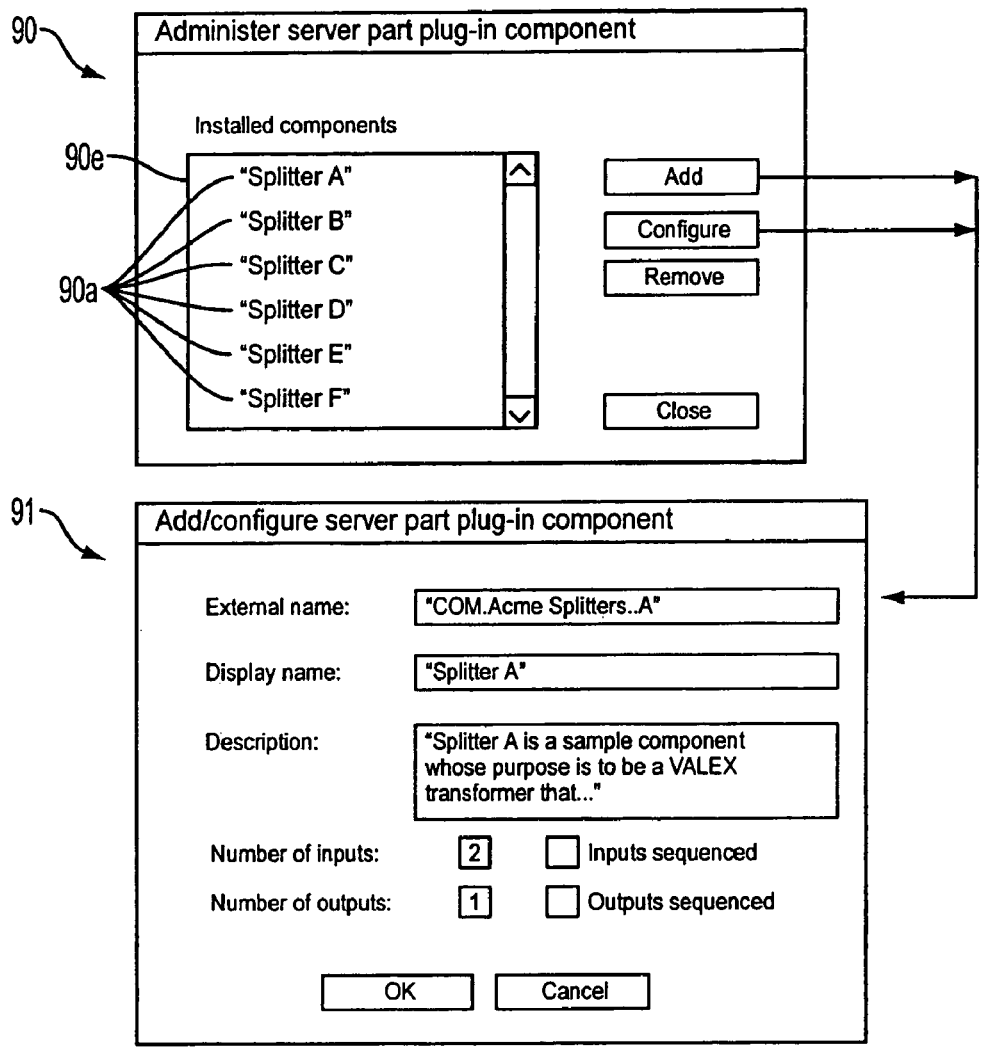
FIG. 8 illustrates one example of a user interface for administering a server-side plug-in component.

FIG. 8 illustrates an example user interface for administering and adding/configuring server-side plug-in components for a client/server application. The depicted interface, or one with similar functionality, may be used in one example, by VALEX™, a program sold by Exchange Applications of Boston, Mass.

Interface screens 90 and 91 which are shown in FIG. 8 may be displayed on the screen of a general personal computer, or any other computer. Interface screen 90 may include a list box interface 90e entitled "Installed components" that displays the set of currently installed and configured server-side plug-in components 90a. An installed server-side plug-in may be selected by a user. Where the plug-ins are identified as pre, post or override plug-ins, each type of plug-in being associated with a transformer, access to an installed server-side plug-in may be provided through the interface that permits the transformers to be assigned or applied in the application. For example, a splitting operation interface may be used in building a marketing campaign. When a server-side component is installed, the applicable screen may provide access to the splitter plug-in. The server-side plug-in components may be added or removed.

When added, or configured, an additional interface screen 91 may be invoked. This interface screen may include information related to the plug-in component. In the example illustrated in FIG. 9, this screen includes an external name (which may, for example, be used to provide access to the plug-in, e.g., a file name), a display name (which may appear on a screen allowing a user to select the server side plug-in), a description, and other information. In this example, the information includes a number of inputs, a number of outputs and the possibility that the inputs and outputs may be sequenced or ordered. Of course a variety of formats and information may be used for permitting installation and outlining specification of plug-in components.

Administering the Collaboration of Client and Server Plug-In Components

Figure 9:
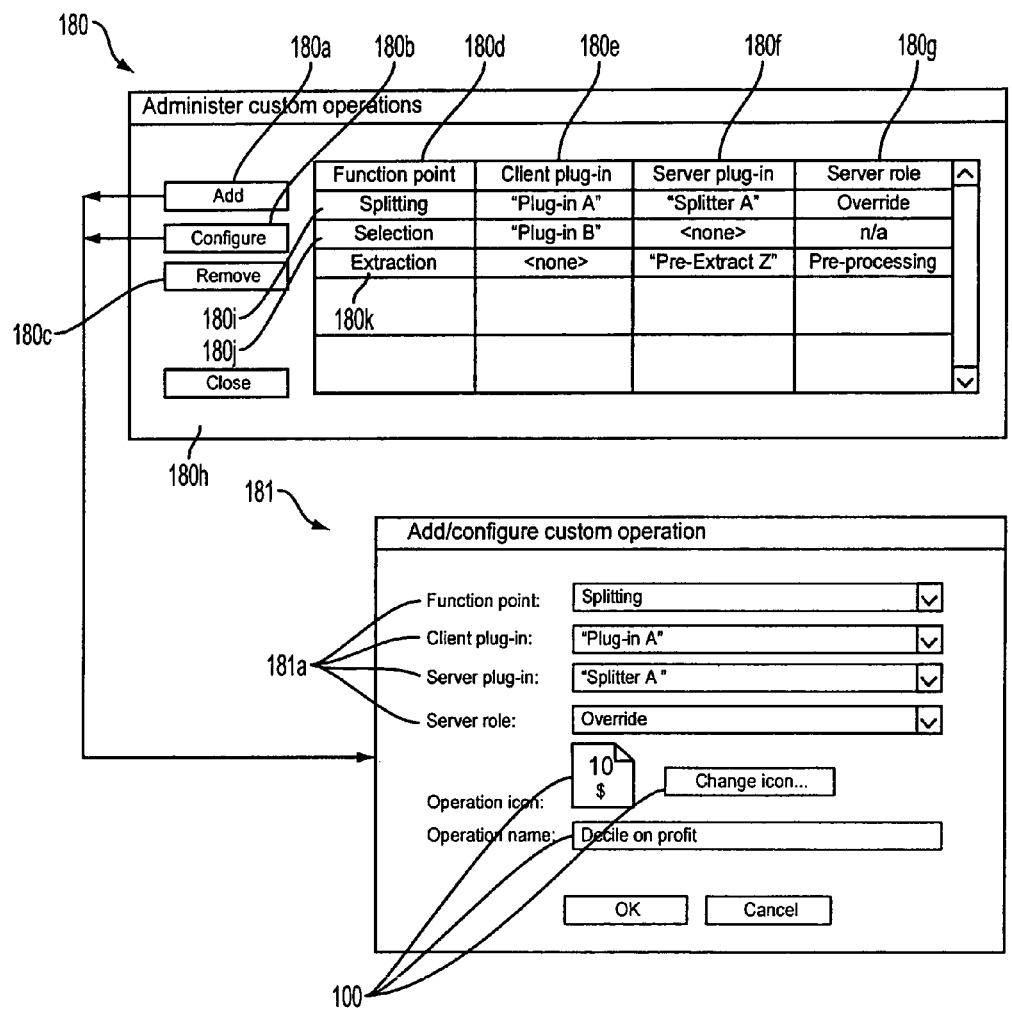
FIG. 9 illustrates one example of a user interface for administering custom operations defined by plug-in components.

FIG. 9 illustrates an example user interface for administering plug-in components that may require collaboration between a client side plug-in and a server side plug-in. Operations are functions that comprise an application, i.e., provide the semantics of the application. In one embodiment, a client-side user interface plug-in component receives specifications from a user which are transported as parameters from the client-side plug-in component to a server-side plug-in component. The server-side component interprets the parameters and conducts processing to implement the desired functionality specified by the user. For example, a client side plug-in for a split operation in a marketing campaign may permit a user to input a metric for splitting cells in a marketing campaign. The server side plug-in may use that input information in actually performing the split operation.

In this embodiment, the user interface may include interface screens 180 and 181. Administration interface screen 180 may include a table having columns 180d-180g with headings such as 'Function', 'Client Plug-in', 'Server Plug-in' and 'Server Role'. The "function point" column 180d would specify the particular function, operation or transformer with which the plug-ins identified in the columns 180e-180f are associated. For example, the splitting operation of a marketing campaign is identified at 180i.

The client plug-in column 180e would permit a user to specify the name of a particular client side plug-in associated with the function identified in column 180d for this row. In this case, the splitting operation function 180i has a client plug-in labeled "plug-in A".

Similarly, the "server plug-in" column 180f would permit specification of a server side plug-in associated with the operation identified in column 180d.

Finally, the "server role" column 180g identifies the type of processing performed by the server plug-in specified in column 180f. As discussed above, the server role may include pre-processing, override processing or post-processing.

The table may include rows 180i-180k corresponding to information about any existing installed and configured client and server plug-in components.

Button interfaces 180a-180c allow a user to add, configure or remove a custom operation in the table. If, for example, a user wants to add a new custom operation to the application, the user may click (for example by using a mouse) on the 'Add' button 180a on the interface screen 180. This action prompts the add/configure interface screen 181 to open with blank fields 181a and 181b. In one embodiment, these fields 181a and 181b may have default values assigned by the application. In another embodiment, a user may define the fields 181a. The fields 181a may indicate the association between a client and a server plug-in component with respect to a function in an application, for example, a function in the planning or executing a marketing campaign. The fields 181b may indicate the representation of the custom operation as it appears to the user, in the form of an icon or text. A similar process may be used to edit a custom operation by pressing the 'Configure' button 180b on the Administration interface 181. By selecting an installed custom operation from the table in administration interface 180, and then choosing the 'Configure' button 180b, the add/configure screen 181 opens and the fields 181a and 181b display values previously assigned to the custom operation chosen from the table in administration screen 180.

Accessing each of the associated client and server plug-in components may be performed as generally described above. In some embodiments, a common interface screen may be used both for invoking the client side plug in and for applying or associating the server side plug-in with the operations to be performed on the server. For example, if a custom client side plug-in is invoked from a screen for a splitter function of a marketing campaign, the client-side plug-in may permit both input for the custom splitter operation and also the actual association of the server-side plug-in with the particular splitter box in a campaign being edited.

Collaboration between Client-Side and Server-Side Plug-In Components

Figure 10A:
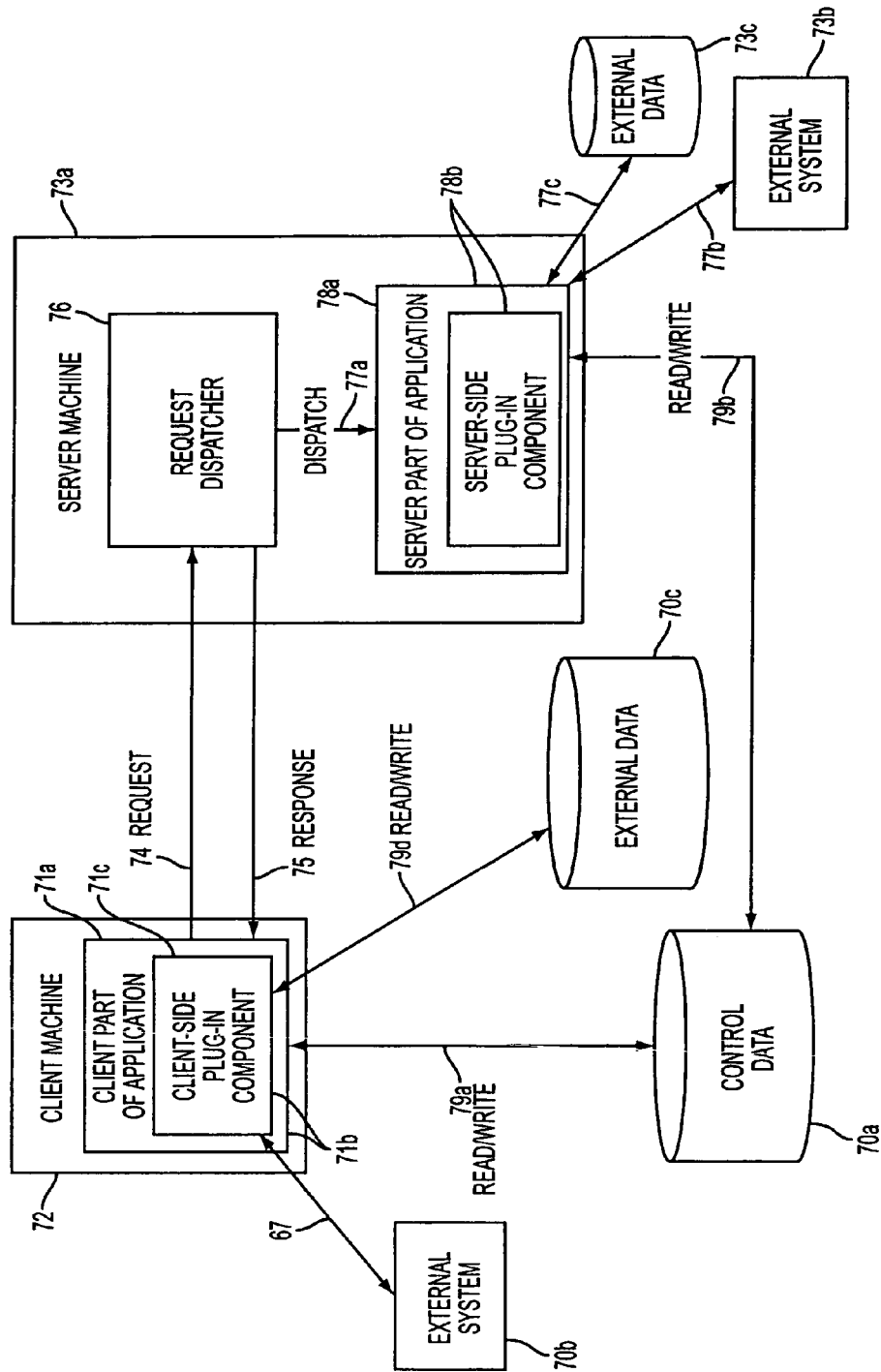
Figure 10B:
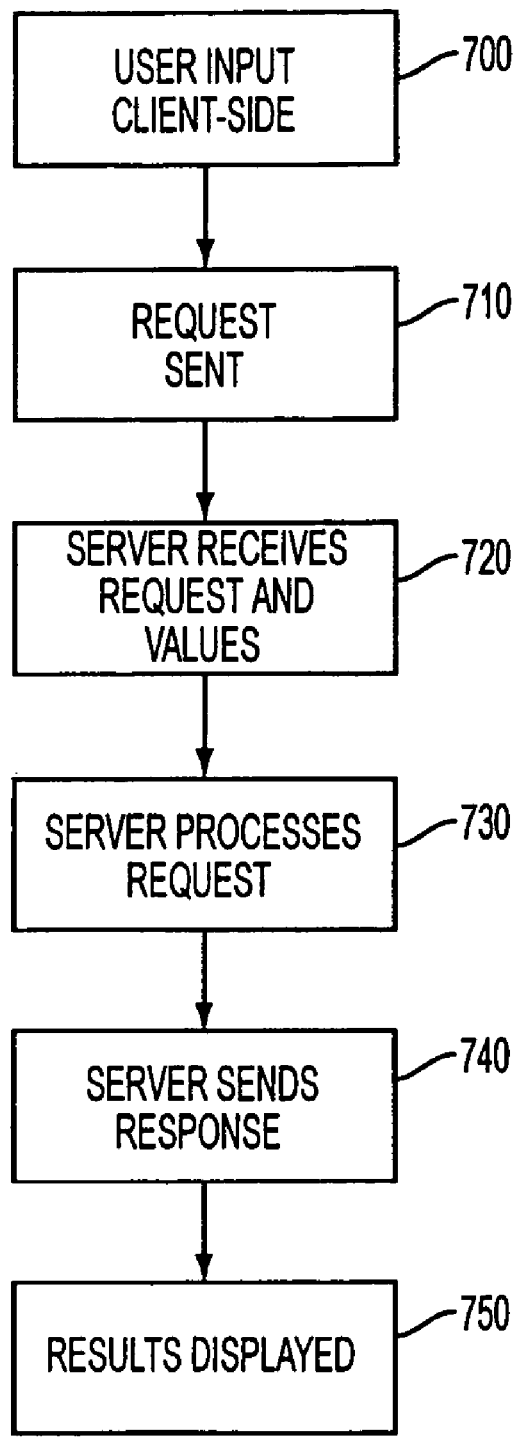
FIG. 10B illustrates a flowchart of one example of a client and server interaction.

FIG. 10A illustrates a system with both client-side 71c and a server-side 78c plug-in components in the same application. As shown, both the client-side and server-side plug-in components may access external data 70c, 73c, respectively and communicate with external systems 70b, 73b, respectively (of course, both could also access the same external data). This system is similar to the system of FIGS. 5 and 6A, except that collaboration of plug-in components is provided for. The process of interaction between the client machine 72 and the server machine 73a of FIG. 10A is shown in the flowchart of FIG. 10B and may be similar to the process discussed above in the discussion for FIGS. 5 and 6A.

In step 700, a user inputs a request on the machine 72. If a client-side plug-in component 71c exists, the user may be provided with, for example, a display of input choices unique to the client-side plug-in component 71c. In one example discussed above in reference to FIG. 5, the user may have an option of selecting a group of customers in a geographic region based on maps supplied by a client-side plug-in component 71c.

The user input is sent as a request (74 of FIG. 10A) in step 710 to the server machine 73a. The values and information the server part of the application uses to process the request may also be included in the request received by the server in step 720. The server processes the request in step 730 which may include using a plug-in component 78c for pre-processing, post-processing or override processing.

For example, the server may complete processing operations to identify a group of customers in a geographic region from a group of customers from, for example, a marketing database. The resulting list of customers identified by the server part of the application 78a is sent in a response 75 to the client-side of the application 71a at step 740. The resulting list may then be displayed to the user, step 750, although the results may also be sent to a file, table, disk, etc.

Figure 11:
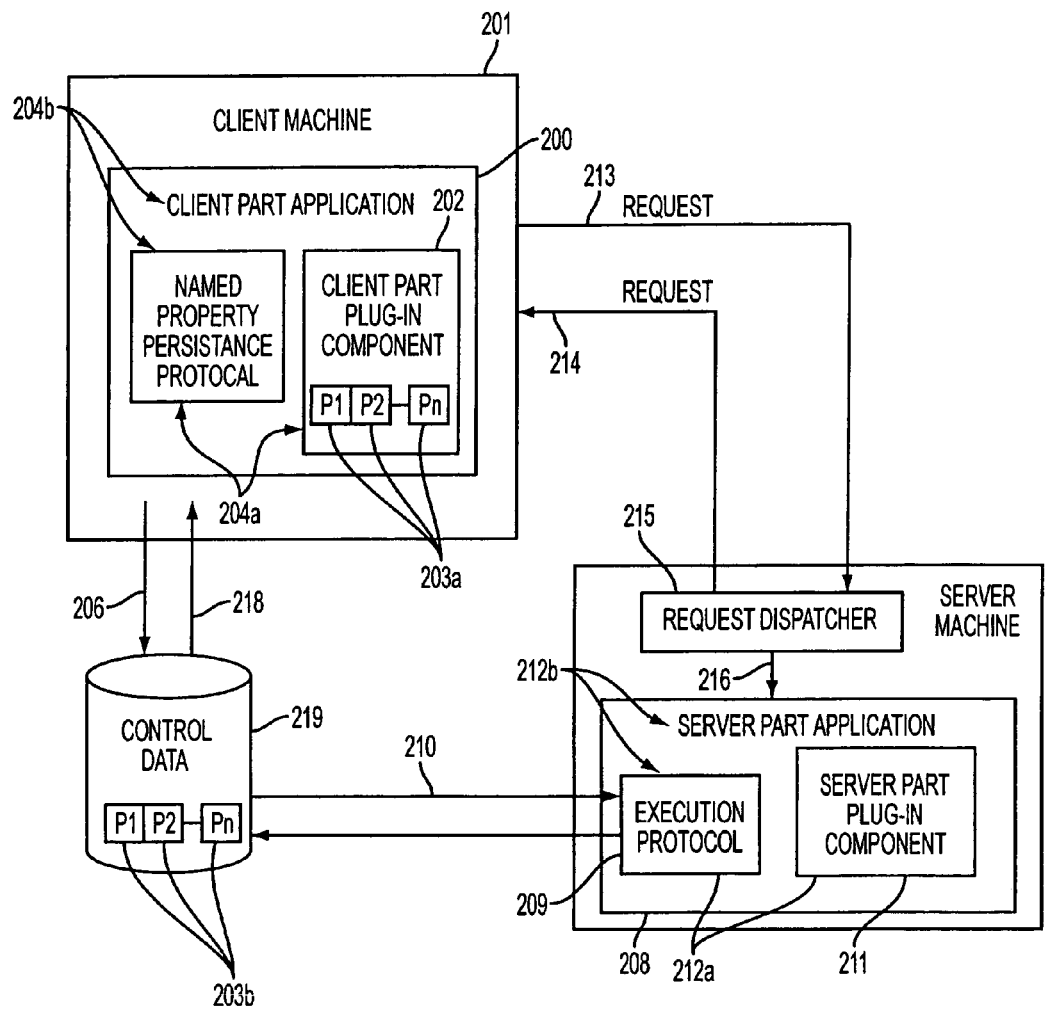
FIG. 11 illustrates an example of collaboration between a client and server plug-in component.

FIG. 11 illustrates one example of a collaboration between two separate, but administratively-associated, client-side and server-side plug-in components. While a marketing context is used, this is only as an example and collaboration between client part of an application and a server part of an application may be applied to other client/server applications.

The client-side of the application 200 running on the client machine 201 hosts (i.e., contains) one or more client-side plug-in component(s) 202. These components have some number of named properties 203a and 203b which are shown in FIG. 11 as P1 (property one), P2 through Pn.

A user may engage the functionality of one or more client-side plug-in components and enter values for certain fields made available to the user through the user interface of the plug-in. Then, at some point during the interaction between the client-side application 200 and the user, the user may request that the application save the state of application. A user may also define an association between a given client-side plug-in component and a given server-side plug-in component. The association allows the persisted name properties of the client-side plug-in component to be persisted (203b) and to be available to the server-side plug-in component after the server-side plug-in component is invoked and allows collaboration between the client and server parts of the application. These named property/value pairs may be, for example, the input parameters 610b of FIG. 6B.

In this example, a named property persistence protocol 205 may be used to coordinate the interactions 204a and 204b between the client-side 200 and the client-side plug-in component 202. A persisted property protocol allows properties that are used and configured by client and server components to be saved for access by other components. These saved values may then be used to initialize properties upon start up or initialization of an application.

There are several types of persisted properties which may be used. One-way persisted properties do not have their state information restored or retrieved by an application. Instead, the application can save those properties in a one-way manner such that the current state of those properties is read from the plug-in component and saved to the control data storage of the application. Two-way persisted properties may have their state information both saved and restored by the application. The application can save and retrieve these properties in a two-way manner such that the current state of those properties is read from the plug-in component and saved to the control data storage of the application when the container which hosts the application has its state saved. When a plug-in component is initialized by the application, the last saved state information for the two-way persisted property is restored. Non-persisted properties include information used or configured by the components that is neither saved nor retrieved. The plug-in components named properties may be persisted without the component having any knowledge about the specific semantics of either the named properties or any values assigned to them.

In the example shown in FIG. 11, the client part 200 may access 204b the named properties and their current values (specified by the user through the user interface) since the client-side plug-in component 202 makes those properties and their respective values available 204a in a manner prescribed by the protocol 205. Once the client part 200 has access to the properties and their values 203a, it can represent and save them through connection 206 into persistent control data storage 219. The client part application 200 may also use connection 218 to retrieve the persisted properties 203b at some later point in time when it is requested to display the user the last saved state of the client part application. When the client part application 200 loads and activates plug-in component 202, the client part application 200 may supply, to the client-side plug-in component 202, the properties and their values so the plug-in component 202 can display to the user the values last saved by the user.

Then, the user may ask (directly or through a request dispatcher) that a certain function be carried out. This results in a request 213 being issued from the client part 200 (for example) to the server part 208. The request 213 may be received (or formulated) by a request dispatcher 215 which delivers 216 the request 213 to the server part of the application 208. When the server part 208 receives the request, the server part 208 interprets the request and processes it.

In the course of carrying out the request, the server part may engage the services of a server-side plug-in component 211 with which it understands how such engagement 212a and 212b is to proceed, according to an execution protocol 209. For example, the server part may access the persisted properties 203b of the client-side plug-in component 202 from the persisted control data 219 through connection 210. The application keeps track of the persisted named properties and their assigned runtime values. The server part 208 may make these properties 203b available to the server-side plug-in component 211 through connection 212b. The server-side plug-in component 211 may access 212a the properties (and the values bound to them) in a manner which is prescribed by the execution protocol 209. When the server part 208 finishes processing the request 213, a response 214 may be delivered to the client part of the application. This response 214 may have a result that is subsequently displayed to the user through a user interface. In an alternative embodiment, the response 214 may indicate to the client part application 200 that it may access the computed result through connection 218 from the control data 219 in order to display it to the user.

Invoking Plug-ins

Figure 12A:
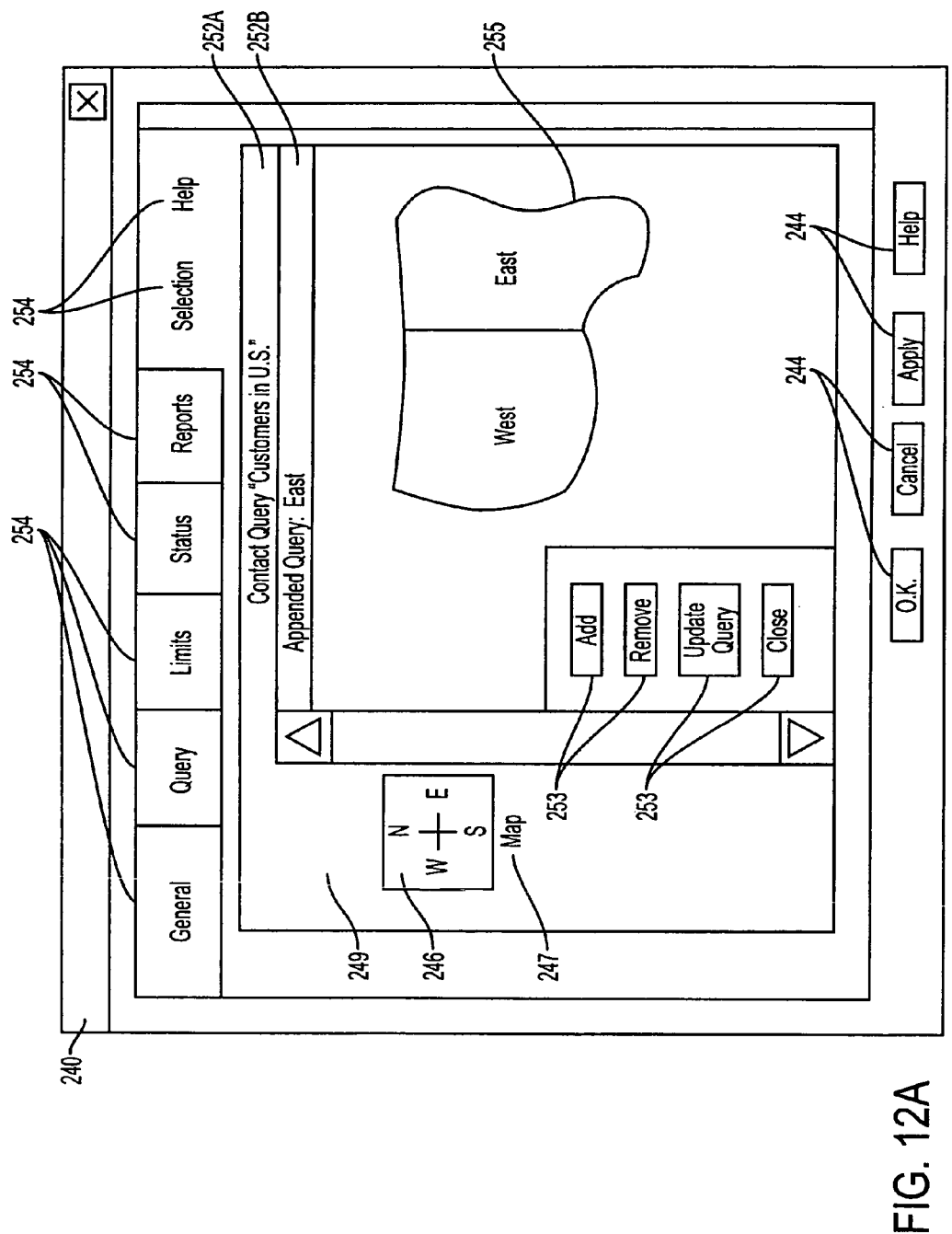
FIG. 12A illustrates an example of an interface used to specify collaboration between client and server plug-in components.
Figure 12B:
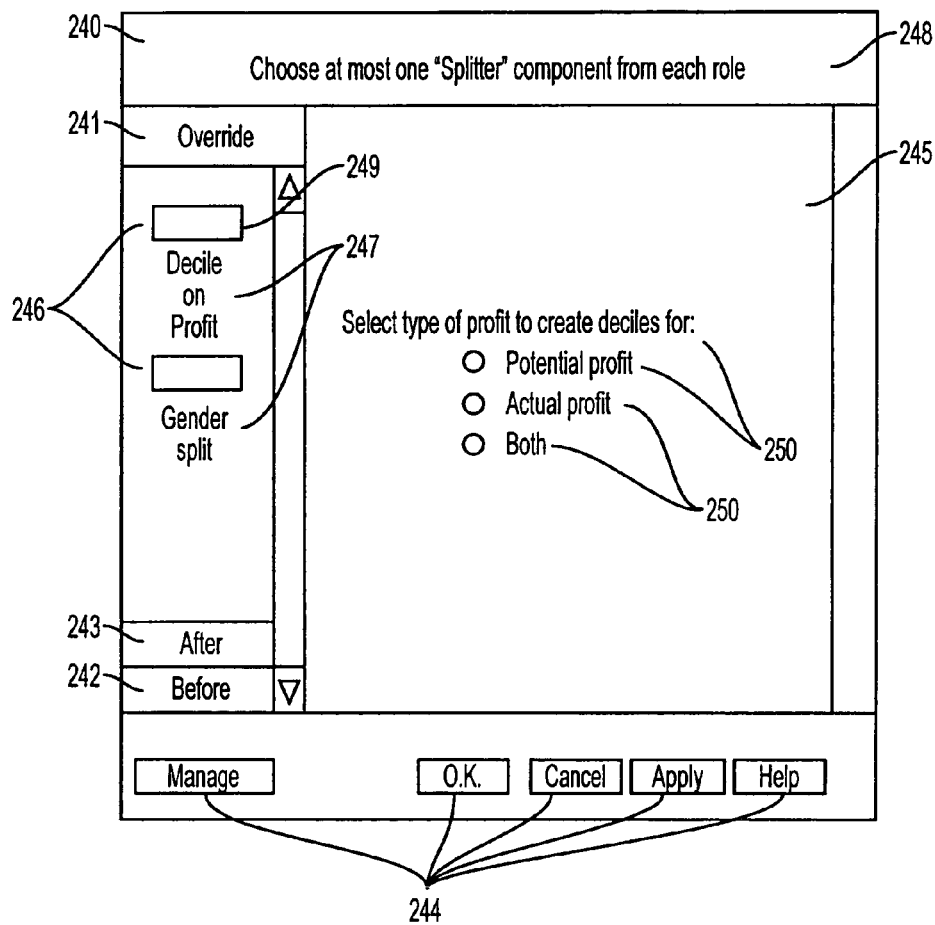
FIG. 12B illustrates an example of an interface used to specify collaboration between client and server plug-in components.
Figure 12C:
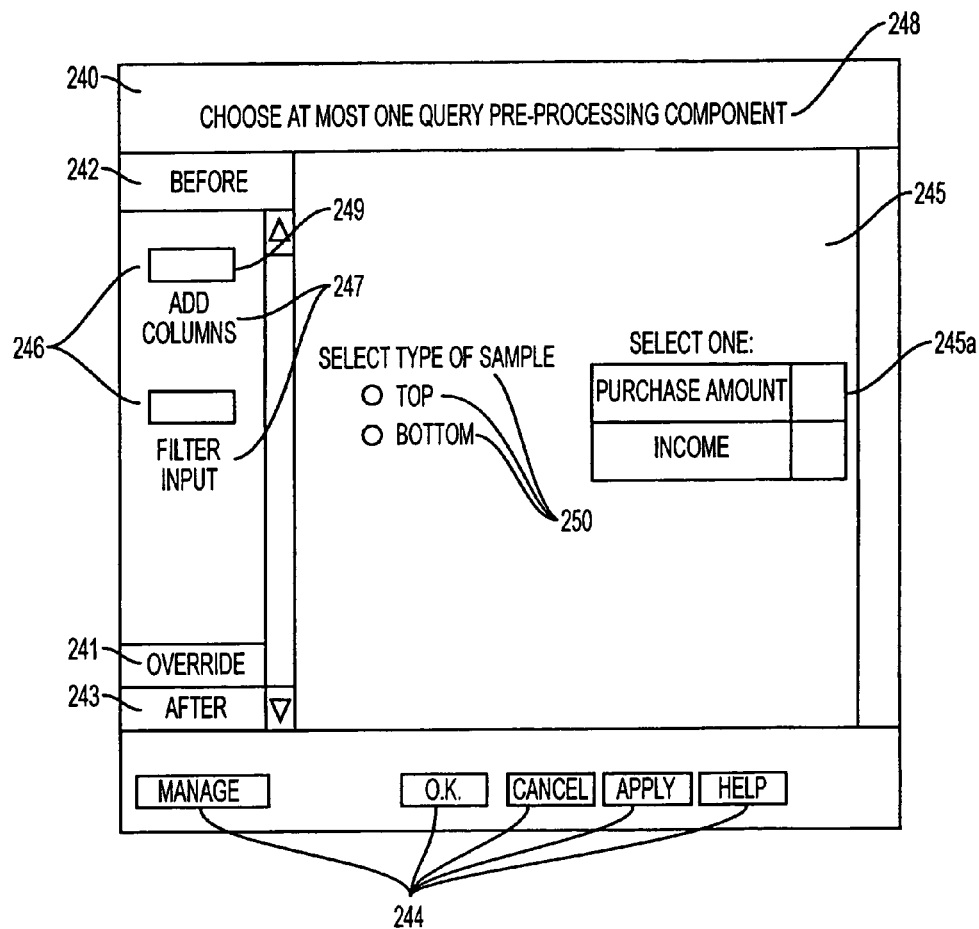
FIG. 12C illustrates an example of an interface used to specify collaboration between client and server plug-in components.

FIGS. 12A-C illustrate four example interfaces for a client/server application which may allow a user to specify a collaboration between two separate, but administratively-associated, client-side and server-side components. The examples follow the defining of a custom operation, such as through the administering of a custom operation discussed above in reference to FIGS. 7-9. Once defined, the custom operation is available at a specified function point (described above, e.g., query, splitter, etc., in the marketing context) within the application (a point about which the application has implicit knowledge based on the semantics of the application), and the user is provided with a user interface which coordinates collaboration between components.

FIG. 12A illustrates an example interface 240 using a client-side plug-in component in the particular context of formulating a query in a marketing campaign system. In the example of FIG. 12A, the user has already invoked a screen permitting formulation of a query. (Invoking the query function can be done as described above for formulating a campaign in a campaign marketing system.)

The tabs 254 permit the user to access tools that help in formulating the query. Thus, each tab represents a subcategory of functionality, associated with the basic operation of formulating a query. Those functions provided by client-side plug-ins that are "opaque" to the application (i.e., not a part of the original application) are categorized according to user-defined (add-on) categories. Other categories may correspond to function points provided with the application, and as such, are defined within the application itself and accessible through the existing screens (or interfaces) for those operations or through a plug-in screen accessible from those screens.

Figure 3C:
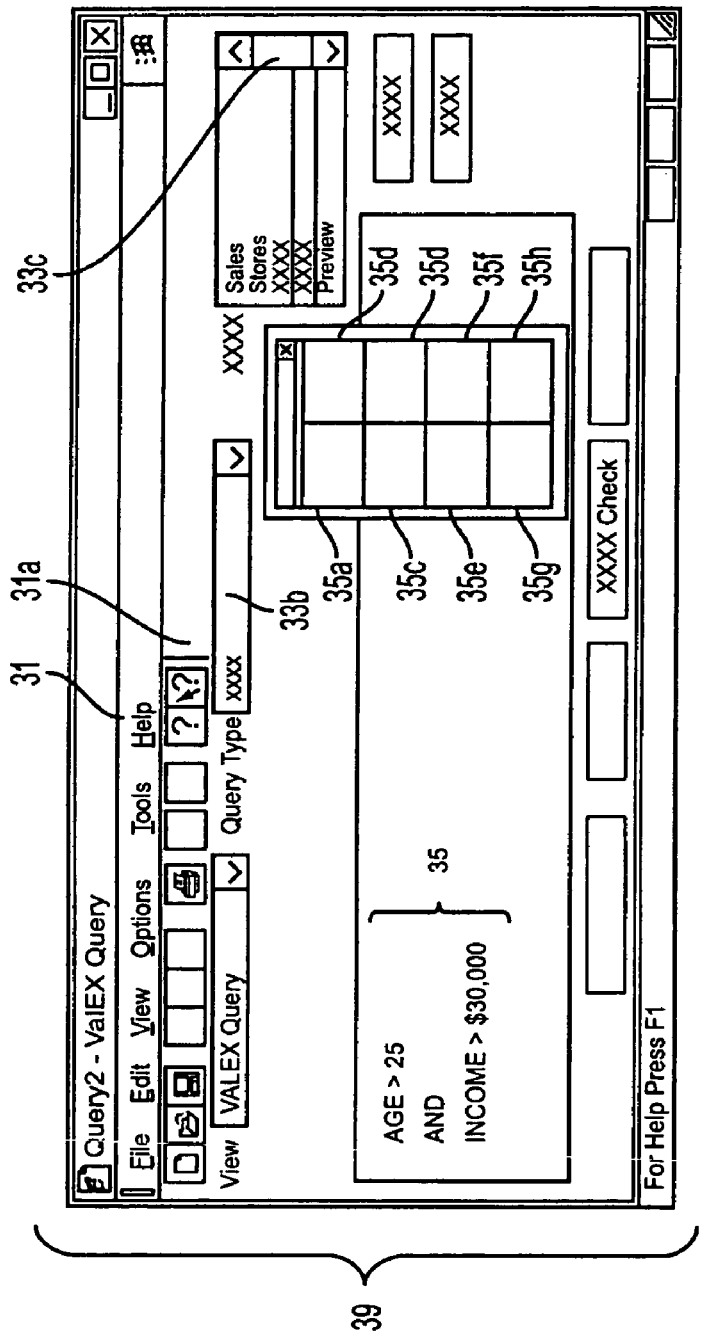
FIG. 3C illustrates one example of a graphical user interface for constructing a query.

The example of FIG. 12A follows the example discussed above in reference to FIG. 5, where the plug-in component provides access to a map to allow a user to specify a demographic breakout of a user-selected group of customers, the specified breakout to be added to a query that is being formulated. In this example, the user may also choose other menu tabs 254 to view or configure, for example, the query being formulated, status, view/generate reports, etc. the particular tabs are illustrative and a different interface could be readily configured based on the disclosure provided herein. As just one example, the selection tool could be accessible through an icon located below to button 35g in FIG. 3C.

In the example of FIG. 12A, a user has selected the menu tab "Selection Help" which includes one icon 246 labeled "map". The icon list 249 may also include other configured plug-in or customized components (or icons corresponding to plug-ins provided with the initial application) suitable for "Selection Help" in formulating a query. In this example, the user is updating the contact query "Customers in the U.S." which is shown in title bar 252a. (This may occur, for example, when editing a portion of a campaign that has a query component (like box 34a of FIG. 3B) labeled "Customers in the U.S."

When the user presses the map icon 246, execution of the corresponding plug-in is invoked, resulting in display of map 255. In this example, the user is able to select a region of the map by clicking either "East" or "West" and choosing a function by pressing a button 253. If a user chooses to update the contact query by selecting users in the East, for example, the user may choose the update query button 253. This may also involve the communication of plug-in components with the host (or container) contact query through its object API and cause the contents of the query for this aspect of a marketing campaign to be modified. This results in the title bar 252b being updated with the appended query "East". The updated query value may then be used by a server part application to process the query request from the user.

The interface screen 240 shown in FIGS. 12B-C may be displayed on the screen of a general personal computer, or any other computer. In this example, FIGS. 12B-C illustrate example interfaces to use server-side plug-in components and transformers in the marketing context. These interfaces may be available to a user, for example, after the custom operation which describes any association between the client-side plug-ins and the server-side plug-ins (with the intent that they collaborate) is defined by administering client-side plug-ins, server-side plug-ins, and custom operations, in a manner discussed above with FIGS. 7, 8 and 9.

An interface screen similar to the interface screen 240 may be invoked for each of the types of functions or transformers for which a server side plug-in may be written. For example, in the marketing campaign context, interface screens for selection of server side plug-ins may be available for query, splitting, sampling, extracting and other functions. The interface screens may be invoked in one of any of another number of known ways, such as by selecting icons from a tool bar, providing selectable tabs (such as the tabs 254 of FIG. 12A), through pull down menus and through other ways.

In the example of FIG. 12B, the interface screen 240 includes a title 248 describing to the user possible actions. In the particular example shown, the user is prompted to choose at most one "splitter" component (for use in a campaign being formulated). Interface screen 240 may also include an icon list 249 which allows the user to select a particular custom operation by selecting an icon. Each previously installed and configured custom operation may appear in the list as an icon 246 together with some descriptive text 247 below the icon that identifies the name of the operation. Some or all of the possible commands in the interface screen 240 may also have push-button interfaces 241, 242, 243, and 244. This icon list 249 allows the user to see three separate lists—one list for each of the override, pre-processing (i.e., Before 243) and post-processing (i.e., After 242) operations.

As shown in FIG. 12B, the currently selected list is for the override functions 241; all custom operations which have a server role which is to override a given function point within the application appears in this list. In this example, two such custom splitter operations have been configured in—one named "Decile on Profit" and another named "Gender Split". The "Decile on Profit" operation may perform the function of dividing a set of people who are in a targeted marketing cell into ten groups based on their level of profitability. The "Gender Split" operation may perform the function of dividing a set of people who are in a targeted marketing cell into groups based on the gender of each person.

In the interface screen 240, if the custom operation includes only a server-side plug-in component (i.e., the server-side plug-in component is not associated with a client-side plug-in component), then the user may simply select a custom operation (e.g., the one named Decile on Profit) in order to override the function point and achieve the custom operation. (In some cases, no user input is needed to be defined through a plug-in component.)

On the other hand, if there is a client-side plug-in component associated with the server-side plug-in (through the previously defined configuration of the custom operation), then the client side plug-in may be invoked when the icon is selected. In this example, the client-side plug-in uses the work area 245 of the interface screen 240 for input of data. For this client plug-in, the fields 250 which make up the user interface of the plug-in are displayed. For the "Decile on Profit" custom operation, the user may see a user interface requesting an input specifying the kind of profit to base the split upon.

Other server roles include pre-processing with respect to a server-side function point and post-processing with respect to a server-side function point. In one example, any custom operations associated with the pre-processing role may appear when the user presses the push button labeled Before 242.

FIG. 12C illustrates an interface screen 240 that may be used for selecting pre-processing components for a query transformer operation in a marketing campaign application. As with the embodiment illustrated in FIG. 12B, the interface screen 240 may be invoked as a part of selection for a particular query of a marketing campaign (e.g., query 34a of FIG. 3B.). As discussed above, a variety of mechanisms can be used to invoke the interface screen, including tabs, pull down menus, icons and other devices.

As explained above with reference to FIG. 12C, the current interface screen is showing pre-processing components, as indicated by the presence of the "before" button 242 at the top of the icon list 249. By selecting the override button 241 or after button 243, the user may select a different set of plug-in components corresponding to the applicable override or post-processing context. (In this embodiment, the classification of a server plug-in as pre-processing, post-processing or override processing is made at the time of plug-in creation or configuration. In other embodiments, a user may be able to specify whether a plug-in is pre-processing, post-processing or override processing at the time that the plug-in is specified for use (e.g., configured into the campaign).)

The icon list 249 for the pre-processing component interface 240 includes two icons 246. In this example, the first icon would permit a user to specify a pre-processing component for query that would create a new column in a table of customers that adds specified columns in the table. For example, if the table includes information about past purchases for a customer, the pre-processing component could compute a new column which specifies the total purchases for the customer (computed by adding up the individual purchase columns in the table).

In the example of FIG. 12C, the filter input icon has been selected. Here, a user may specify some filtering of a table before a query is performed on the table. In the example shown, a client side plug-in component is invoked in the work area 245 of the interface 240. For this particular plug-in, a user may select whether the filter will be based on a column in the table labeled "purchase amount" or a column labeled "income." Thus, the column labeled "purchase amount" may include information about total purchases a particular customer in the table has made. The "income" amount may represent an estimate of the individual's income.

Within the input portion of the work area 245, the user may also specify the type of sampling to be made for the filter. For example, a user may take the top 50% of the input table, based on the income of the individual (selected at 245*a*). Alternatively, a user might specify selection of the top 2000 records, based on the input column specification (e.g., total purchases). In any event, these input values may be persisted so that the corresponding server plug-in may use the values when invoked during execution of the campaign.

Selection and input (and, where applicable, invocation of corresponding client side plug-ins) can be performed for post-processing functions in substantially the same manner as pre-processing functions.

Client side plug-in components may be invoked in one of at least two ways. A client side plug-in may be invoked separately from selection or application of any server side plug-in component. For example, a pull down menu, tab, icon or other device may be used to invoke the client side plug in as in FIG. 12A. In the alternative, a client side plug-in associated with a particular server side plug-in may be invoked when the server side plug-in is selected for incorporation into a particular application (e.g., marketing campaign), as in FIGS. 12B and 12C. Thus, when the filter input icon of FIG. 12C is selected for pre-processing of a particular query in a marketing campaign, a client side plug-in associated with the filter input server side plug-in may be invoked. This client side plug-in may permit the user to input information necessary for the selected pre-processing plug-in component.

Various client-side and server-side plug-ins have been described above. Further plug-ins may include a plug-in which provides the ability to import a marketing campaign, i.e., takes its definition from another system and render it within an application as a marketing campaign for that application. A plug-in may import other things such as value propositions or offers from other systems. For example, a marketing planning system may model which offers will be sent out for an entire year. A user may then need to translate the plan into marketing campaigns. There may be a plug-in which can automate the translation and automatically import value propositions into an application. Another example may be a plug-in component which allows a picture display of a value proposition (i.e., offer). For example, if the value proposition is a catalog, the plug-in component may provide the user a picture of the catalog. Other plug-in components may provide various reports to a user. A plug-in may also be used to determine whether a user is allowed to open a campaign. For example, a plug-in may check to see whether the user can view the campaign and if not, it may display an error to the user and close the campaign. Other plug-ins are possible. Further, other custom operations not described above may be used according to certain embodiments of the invention.

Communication with plug-ins may be facilitated using ActiveX automation or some other presently available inter-object communication tool. In addition to user invocation of the plug-in components, the host application may invoke the plug-in. In this case, certain "events" may cause the plug-in to be invoked. For example, each plug-in available to the system may be notified of the "event" of the application being opened (permitting the plug-in to perform any necessary initialization. Other events that invoke the plug-in include (particularly for client-side plug-ins) the host asking for a display created by the plug-in.

For server-side plug-ins, the plug-in may be notified when a corresponding activity has been scheduled (e.g., by a request dispatcher) for execution on the server. For the event of a scheduled operation, the plug-in may receive one or both of a pre-event notification and a post-event notification. The pre-event notification would permit a plug-in to perform pre-processing or override processing while a post-processing event would permit post-processing functions. Plug-ins may also be notified of other events, such as save of a campaign, printing, encountering an error, etc.

Other mechanisms may be used for invocation of plug-ins using object-oriented or other programming paradigms.

Representation of a Marketing Campaign—Object Models and Data Structures

Objects and object models discussed briefly above may be used with or without plug-in components. In the marketing context discussed above, a marketing campaign may be represented as an object to great advantage. A user interface may be used to modify an object such as, for example, when a user modifies a marketing campaign as discussed above. Changes to the marketing campaign would result in changes in the objects representing the campaign. By executing a user request, for example by using a transformer, a server application may use the campaign object and access the user defined objects.

In one example, objects may be used in conjunction with persisted properties. A persisted property is a property whose value may be written to, and read from, a persistent storage medium. The property may be assigned a value at a particular time and when the property is saved, the property and its value, along with any contextual information, is written to some persistent media such as a disk device e.g., floppy, hard disk, zip disk, jaz disk, and other devices. The contextual information may include information such as the name of the item for which the property is an attribute. At a later time, the property and its value may be retrieved by a user or by an application.

Figure 13A:
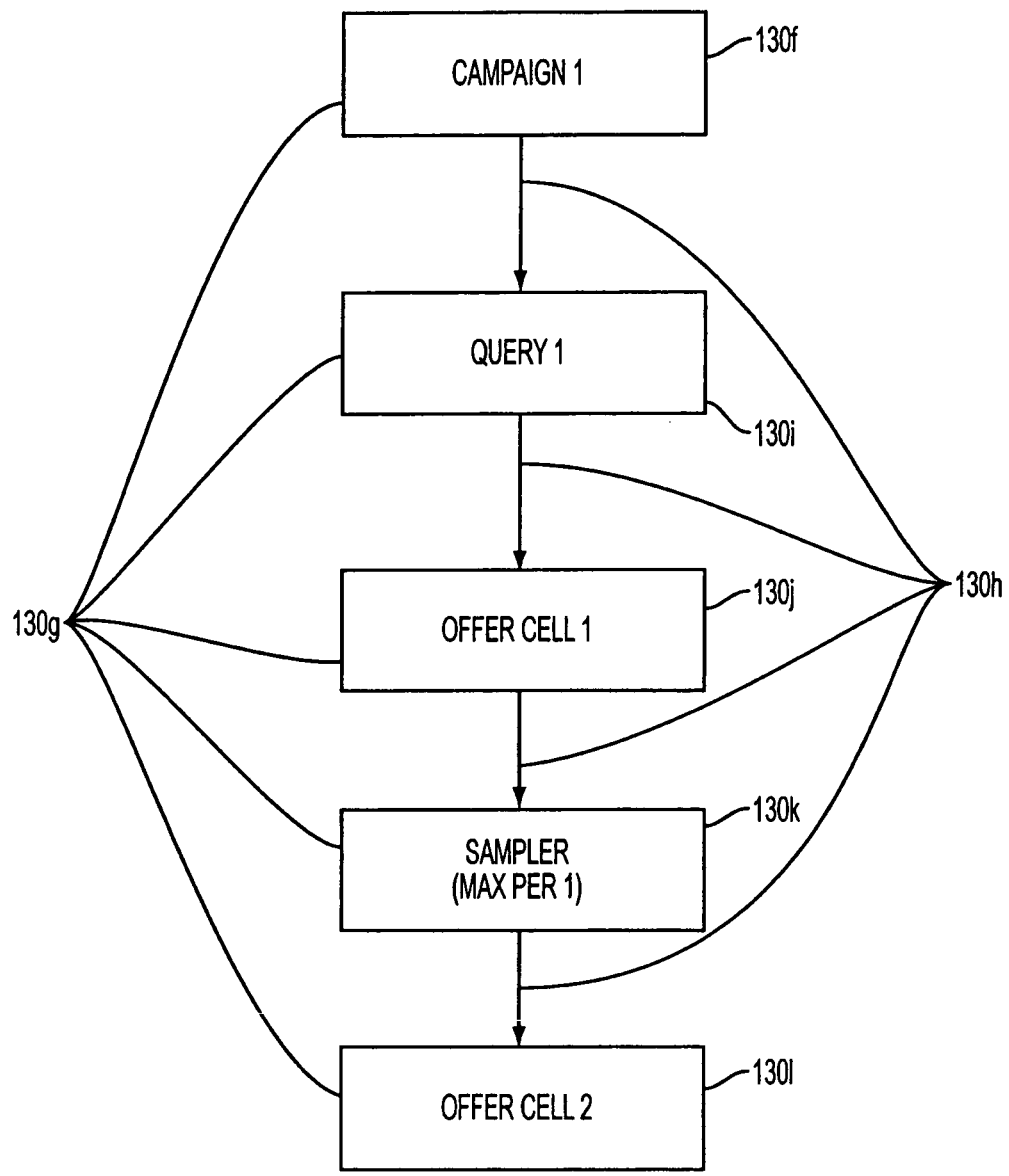
FIG. 13A illustrates one example of performing campaign management.

FIG. 13A illustrates a high level block diagram of a campaign, stored as an object in a campaign marketing system. The objects may be stored in any computer readable media or memory, including floppy disks, hard disks, zip disks, jaz disks, CD rom, random access memory, tapes, etc.

In the marketing context of one embodiment of the present invention (as explained below), objects may include, for example, campaign objects, query objects (which may themselves be part of another object, such as a campaign object), extract objects etc. A user may create, save, and access, business objects, i.e., access the functions (i.e., methods or operations) and properties (i.e., attributes) of those objects. By saving a campaign as an object (which includes a series of business objects), the process of campaign creation, modification and execution is more easily automated. In one embodiment, the business object models are accessible via CORBA, although other protocols may also be used, such as DCOM. A business object model allows both client and server plug-ins as well as the original application code to access application objects. By utilizing a business object model, the components may also persist properties so that other components and operations may access the data.

FIG. 13A illustrates the process of creating a campaign 130*f* which further includes items 130*g* and connections 130*h*. FIG. 13A is shown as an example only. There are many possible ways to design and carry out a marketing campaign based on the disclosure provided herein.

In FIG. 13A, box 130f represents an overall campaign structure. Thus, a specific campaign may be created using a marketing campaign software application, such as the VALEX program described above or any other marketing campaign application. Of course, such software can be used to create and store multiple campaigns. In the example of FIG. 13A, one unique campaign object is stored. This campaign object is shown diagrammatically with boxes 130g and connections 130h. As indicated in box 130f, the name of this particular campaign is "campaign space 1."

The campaign object illustrated in FIG. 13A has only one query 130i. This query is labeled "query 1". This query will receive an input database (part of the specification of the campaign 1 130f). The particular query specified at 130i would be performed during execution of the campaign.

The result of performing query 1 would be an "offer cell." An offer cell is simply a selected portion of a database. Here, application of the query 1 130i to the input database would result in the offer cell 130j. In the campaign object, the offer cell 130j is a specification of the characteristics of the offer cell—the actual offer cell would not be generated until the campaign is executed.

In the campaign object illustrated in FIG. 13A, the offer cell 130j, created using query 1, is then applied to a sampler component 130k. A sampler component may be used to select a subset of an input database (here offer cell 1 130j). For example, the sampler may select the top half of the records in the offer cells, based on some metric (such as annual income for customers). The result of application of the sampler would be a new offer cell 2 130l.

The campaign object illustrated in FIG. 13A is fairly simple. Of course, a campaign may consist of multiple queries, multiple samplers, or additional or different components. In most cases, a campaign will include some step for recording the results, e.g., a component for extraction of the offer cell.

Figure 13B:
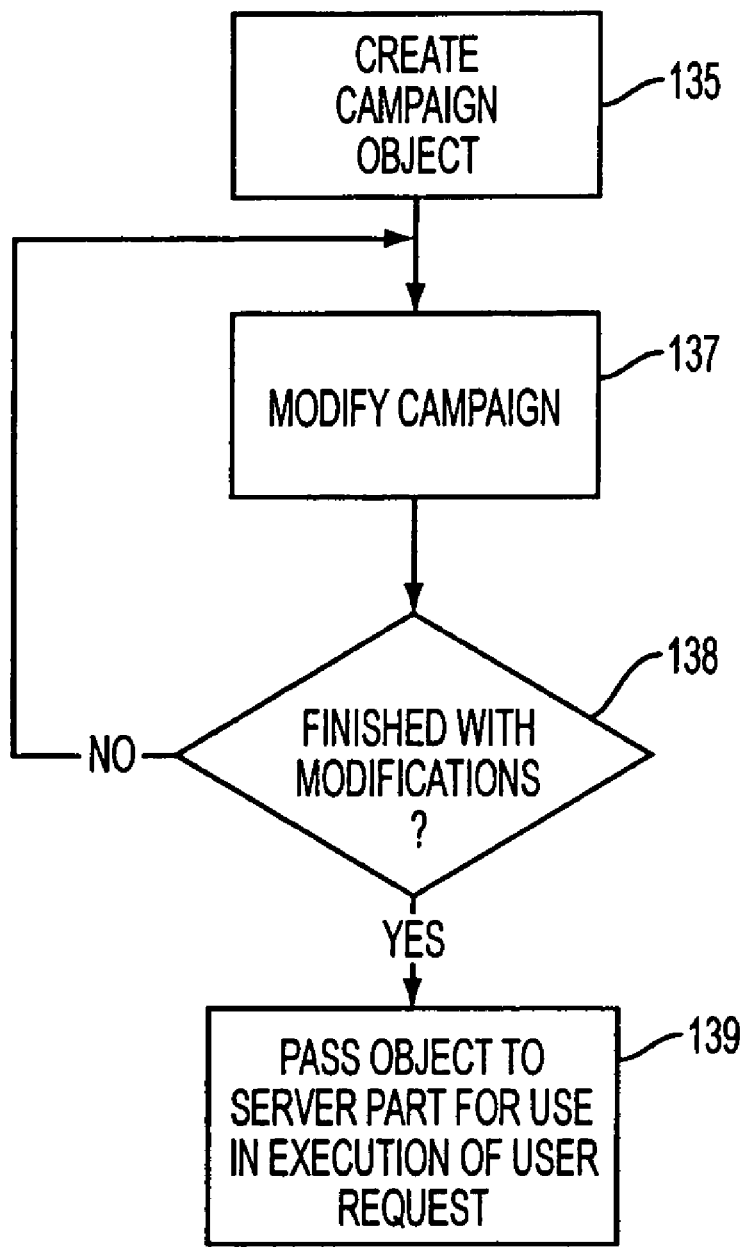
FIG. 13B illustrates a flowchart of one example of creating and using an object.

FIG. 13B illustrates a flowchart for creating and using a campaign object for creating and running a marketing campaign. As discussed in FIG. 13A, a campaign may be created, and the campaign steps of FIG. 13A may be saved, as a campaign object which is, itself, comprised on a series of objects, in steps 135. Examples and specification of one embodiment of a campaign object is provided below with reference to FIGS. 13C-14E.

The actual creation, modification and storage of the objects can be performed using a graphical user interface similar to the one used in the VALEX system described above, or through any other interface. Thus, creation or revision of a marketing campaign may be performed by creating or modifying the campaign object accordingly. Through an interface, a user may also modify a campaign (step 137). In one embodiment, a program such as a script may also be used to modify a campaign object.

In step 138, a user may continue to modify a campaign. When the user is finished, the campaign object may be passed to the server part of the application for execution, in step 139.

Execution of an object for running a marketing campaign may proceed in a fashion similar to that known in the art, but using an object rather than the specific structures known in the art. Thus, an object can be parsed (by the server part or a request dispatcher) to determine the steps and order of the steps of the campaign. The object may also include information that is used by the various components in executing the particular functions or steps of the campaign (such as queries) and may specify plug-ins for pre, post or override processing.

Figure 13C:
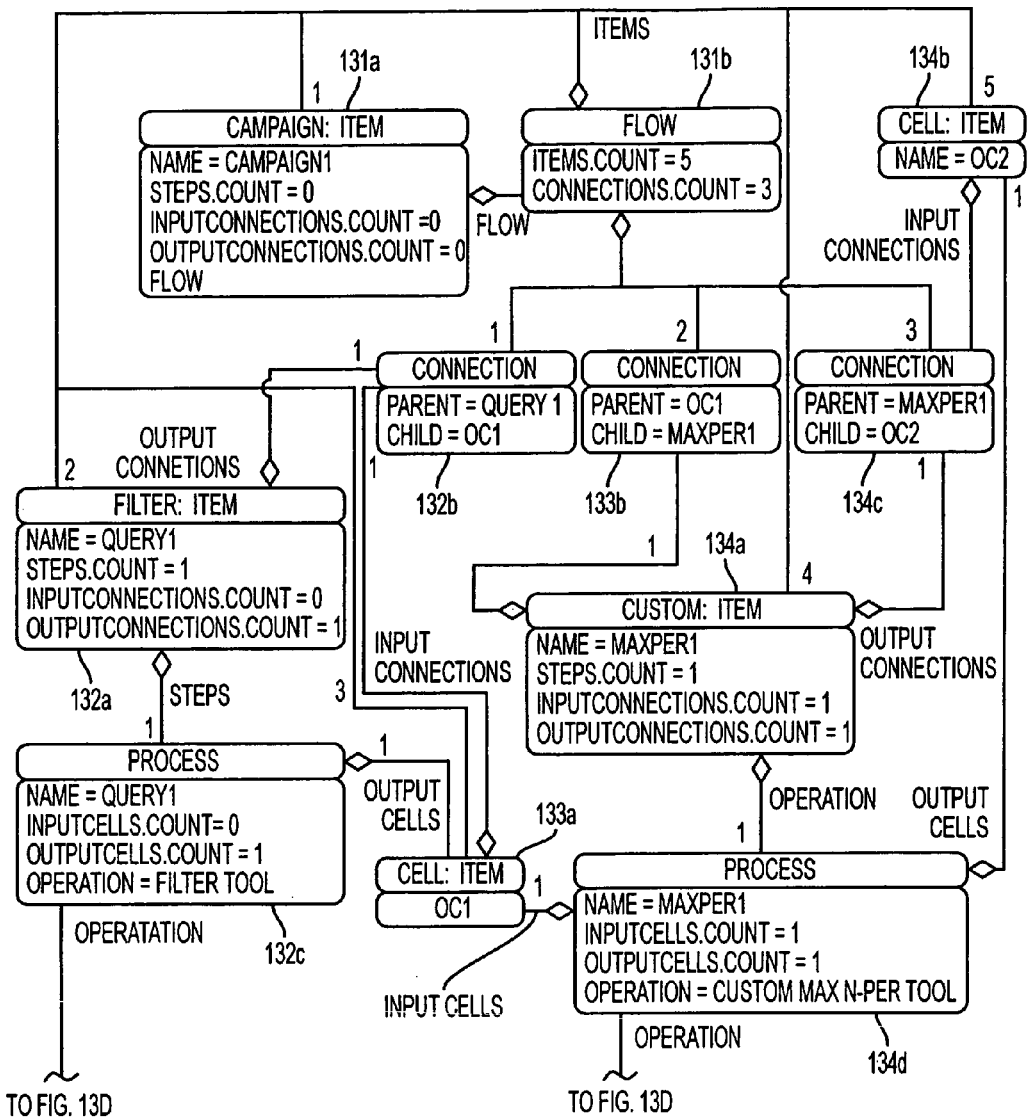
FIG. 13C-13D illustrate one example of an object business model of a campaign performed in FIG. 13A.
Figure 13D:
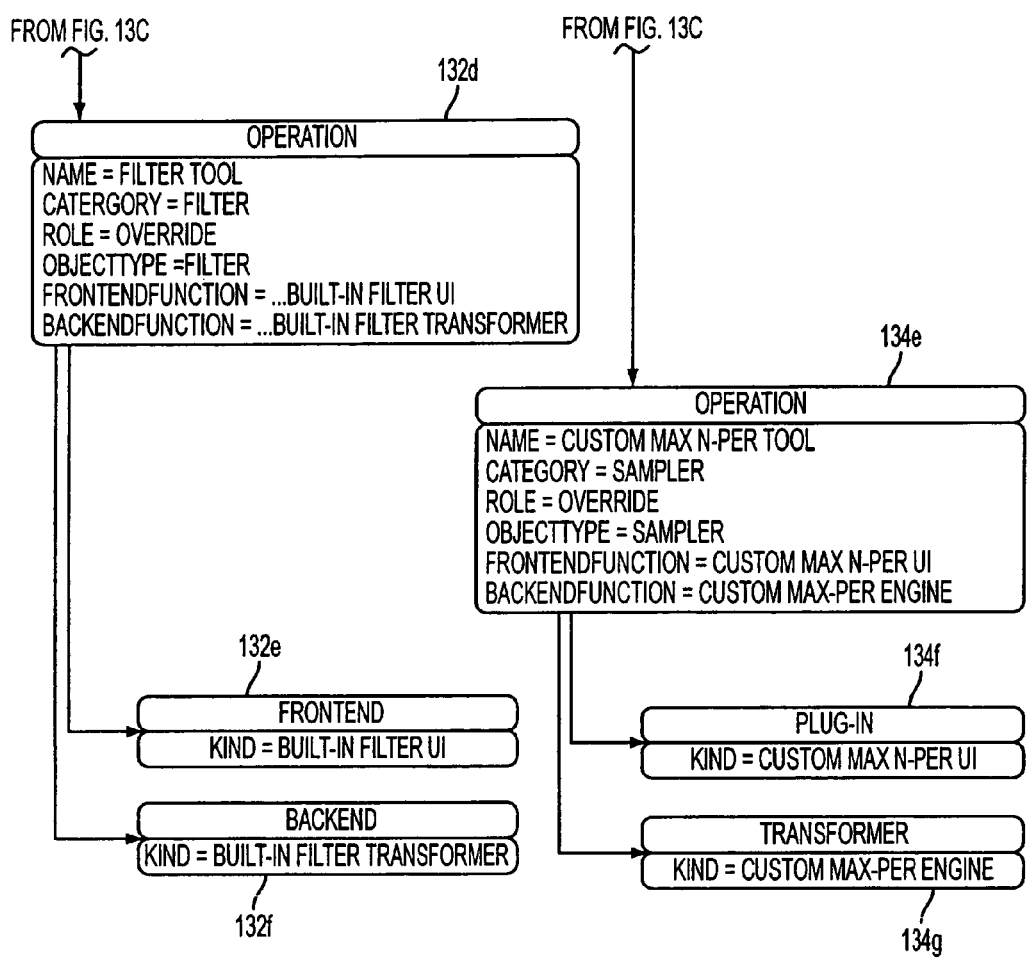

FIGS. 13C-13D illustrate a representation in object model format of the campaign of FIG. 13A. This representation is only one example of object model representation and other formats may be used. In addition, the particular campaign illustrated in FIGS. 13A, 13C, and 13D is shown as an example only and other campaigns with different steps may also be represented in this format.

Campaign 1 is an item 131a which has a flow 131b resulting in a total count of five items and three connections. (Each of the boxes of FIGS. 13C-13D represent an internal record or object of the campaign object 133a.) Query 1 132a includes one step and has one output connection. Query 1 132a invokes a filter tool operation and provides one output (to offer cell 133a). The operation 132d to perform Query 1 132c uses a filter tool, which in this example is an override processing function and uses a built-in (original application) user interface at the front end/client-side and a built-in transformer at the back end/server-side of the application to carry out the processing function.

In FIGS. 13C-13D, the connections between a parent item and child item business object are shown. For example, offer cell 1 (OC1) 133a may be a child which has a parent Query 1 132c (as shown in FIG. 13A). This connection is shown in 132b. In turn, offer cell 1 133a may be a parent to a sampler, such as MaxPer 1 134a, which is a customized (plug-in) sampler 134a producing a maximum number of contacts to receive an offer. The connection between OC1 and MaxPer 1 sampler is shown in 133b. In addition, offer cell 2 (OC2) 134b may be a child of parent custom sampler MaxPer 1 134a. This connection is shown in connection 134c.

Customized (plug-in) sampler MaxPer 1 134a is shown as an example only and samplers (or other functions) with other configurations may also be used. Custom item MaxPer 1 134a is represented as having one step, one input cell (OC1 133a) and one output connection (OC2 134b). The customized sampler in this example may perform an operation to specify a maximum number of contacts to receive an offer by taking the input from OC1 133a and producing an output to OC2 134b. The data may be processed by using Custom Max N-per Tool 134e which in this example, is an override processing function. This results in replacing a sampler function that may otherwise be deployed by the application and that may reside on the server-side of the application.

As shown in FIGS. 13C-13D, this custom operation sampler includes a client-side plug-in component 134f which provides a user interface entitled Custom Max N-Per UI. Including the client-side plug-in in the campaign object permits the application to access those plug-ins when the campaign is edited (even after saving and recalling the campaign). To perform the custom operation 134e on the server side, a customized transformer 134g entitled Custom Max-Per Engine is used to perform the sampling function requested by the user which is input through the user interface 134f.

As shown in FIGS. 13C-13D, the properties of each item and operation is saved in a business object model format. This allows both the client part and the server part to access the characteristics of the campaign and allows the use of the information in future editing of the campaign. In addition, by using business object models, a user may construct a campaign in a variety of different steps without regard to the order in which the steps are chosen, since for each step, the application can access the information stored in the business objects.

Figure 14A:
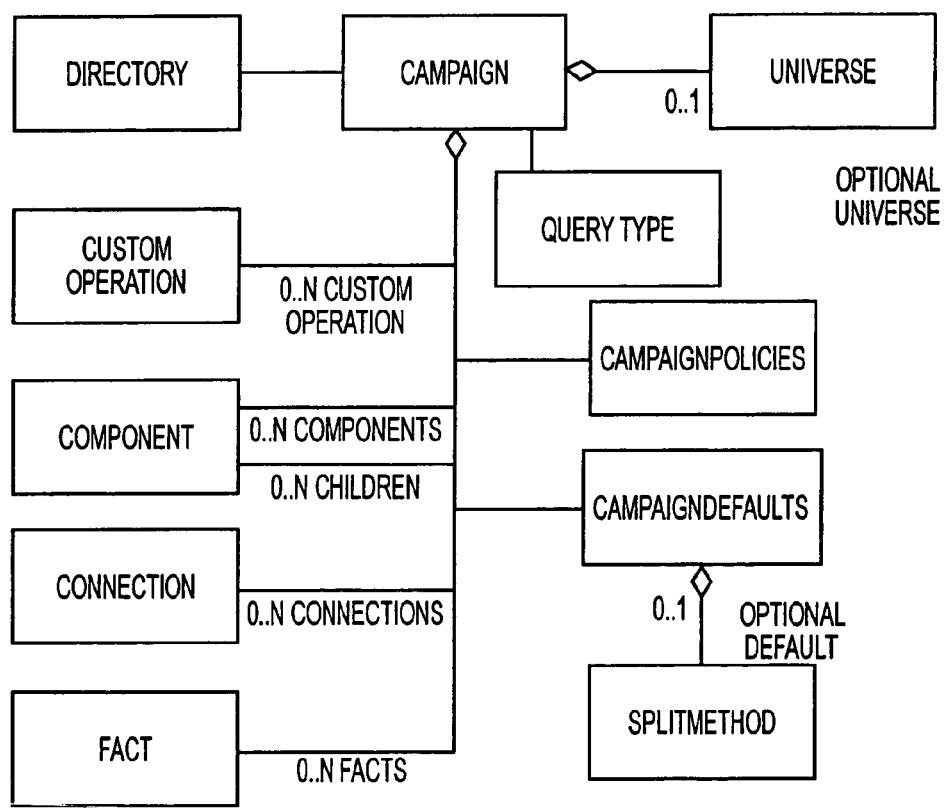
FIG. 14A illustrates one example of a campaign object model.
Figure 14B:
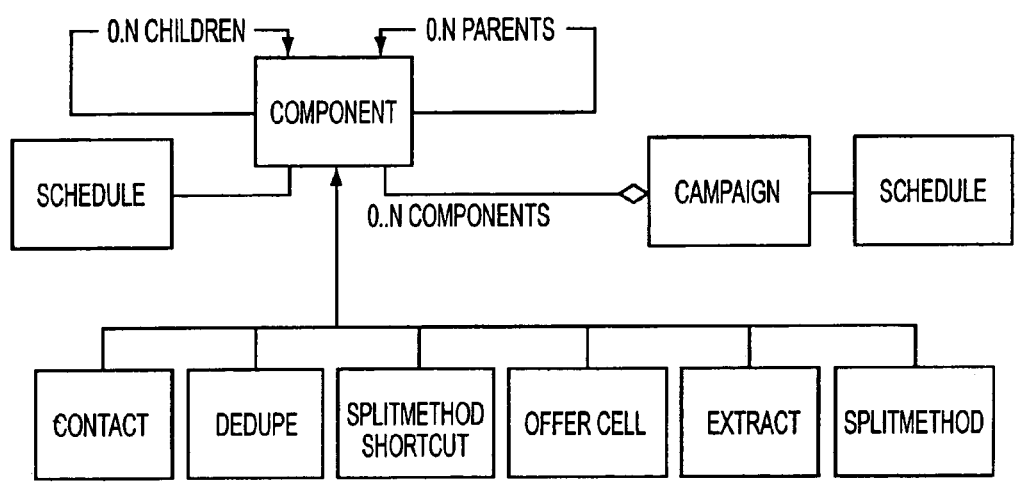
FIG. 14B illustrates one example of a component object model.

FIGS. 14A-14E illustrate further details of one embodiment of implementing an object model. FIG. 14A illustrates a top level of abstraction for this model. Based on the model, a given campaign object typically includes a number of components and connections which describe the campaign. As above, these connections and components may be stored as part of the object for the campaign (and may themselves be objects). When a user interacts with a campaign, the user has access to the properties which are associated with the campaign object.

As shown in FIG. 14A, a campaign object can provide access to one or more campaign operations or components (such as query, split, etc). As illustrated in FIG. 14A, the campaign may include 0-N components with 0-N children and a given campaign may have additional items not shown.

A campaign default object described above in reference to FIG. 14A may define any default for a given campaign. In the example shown in FIG. 14A, the campaign default includes a split method which is associated with a campaign. Included in a campaign default object may be properties which allow the attachment or detachment of campaign default objects from the campaign object.

A campaign policies object may include policies for a given campaign. The properties in the campaign policies object may include such items such as a level of uniqueness required for tracking codes, such as contact tracking codes and offer cell tracking codes. There may be a "counts-are-required" property which indicates whether contacts should be counted before a campaign extract is allowed to be scheduled for execution (i.e., do not bother to send out the mailing until at least a thousand households have been identified). An "extracts-can-run" property may be included to indicate whether campaign extracts are permitted to be executed more than once and an "objects-are-locked" property may be included to indicate whether campaign extracts and campaign components upon which they depend are to be locked once a campaign has been executed.

A directory object may provide a facility to locate an object when another object requests access to that particular object. The directory object may allow a client to locate queries, value propositions, formats, custom operations, requests and schedules in one embodiment of the present invention. In one embodiment, an object may be opened by the name of the object or by the object identifier for the object.

A column object (not shown) may include a representation of a relational table column in a customer database. The table may be used in a campaign. For example, in a query step the column may include a property specifying the owner of the table, an object identifier which provides a unique object identifier for the column object, the name of the table and the name of the column.

An illustrative set of properties for a campaign object are set forth in Table 1. Other or different properties may be included in an object. Further, not all of the properties are necessary for every object implementation.

TABLE 1

| Name | Access | Type | Description |
| --- | --- | --- | --- |
| ObjectID | R/O | VT_BSTR | Unique object identifier for this object. |
| Name | R/W | VT_BSTR | Name of the object - must be unique. |
| Author | R/O | VT_BSTR | Name of user who created the object originally. |
| Description | R/W | VT_BSTR | Description of the object. |
| TrackingCode | R/W | VT_BSTR | Tracking code of the object. |
| TimeLastUpdate | R/O | VT_DATE | Date/time of the last update made to the object. |
| UserLastUpdate | R/O | VT_BSTR | Name of the user who last updated the object. |
| TimeCreation | R/O | VT_DATE | Date/time of the creation of the object. |
| Group | R/W | VT_BSTR | Campaign group - data item specified on the campaign general property page. |
| QueryType | R/O | VT_BSTR | Query type of the object. Objects are created with their type. |
| MaxLimit | R/W | VT_14 | The maximum limit for the campaign is a value which is greater than zero. A value of zero indicates that no campaign limit is defined. |
| Universe | R/O | VT_DISPATCH | If the campaign has a universe, then this is a non-null reference to the associated universe object. Otherwise, this reference is NULL. |
| Directory | R/O | VT_DISPATCH | This is the central directory for the application and may be used to locate or create objects/components to be used by the campaign. |
| Facts | R/O | VT_DISPATCH | [fact Collection of Directory ] Note: applicable fact types are: VX_FT_COUNT_VX_FT_EXTRACT |
| CustomOperations | R/O | VT_DISPATCH | [read-write Collection of CustomOperation ] - this is where customizations like the "Campaign Count Extension" would appear, as would any plug-ins defined to the campaign. |
| Connections | R/O | VT_DISPATCH | [read-write Collection of Connections ] |
| Components | R/O | VT_DISPATCH | [read-write Collection of Components ] |
| Children | R/O | VT_DISPATCH | [read-only Collection of Components ] - These are the direct children of the root - they are DeDupes or contacts connected to the root. |
| CampaignDefaults | R/O | VT_DISPATCH | Reference to the defaults which are used by the campaign. |
| CampaignPolicies | R/O | VT_DISPATCH | Reference to the policies which are used by the campaign. |
| IsLocked | R/O | VT_BOOL | Indicates whether the campaign in general is in a read-only state. If read-only, then this state takes precedence over all other access settings. |

TABLE 1-continued

| Name | Access | Type | Description |
| --- | --- | --- | --- |
| IsModified | R/O | VT_BOOL | Indicates whether the campaign in general is or has been modified since last save, or since open. |
| Schedules | R/O | VT_DISPATCH | Collection of schedule used by one or more components. |

Table 2 describes example parameters and methods used to update the objects. For example, Table 2 illustrates parameters to use to attach or detach an object, parameters to determine whether or not a connection is allowed between two objects and parameters to use to schedule portions of a campaign for execution. These tools may be used to create and modify campaign objects and their components.

TABLE 2

| Name | Parameters - IDL | Description |
| --- | --- | --- |
| Attach | [in] BSTR UniverseObjectID, [in] long eObjectType, [out] BSTR* pExplanation, [out, retval] BOOL* pVal | Attaches (replaces or adds) the current object with the one associated with the specified ObjectID and object type. Indicates whether the universe was attached. If not, an explanation is provided. |
| Detach | [in] long ObjectType, [out] BSTR* pExplanation, [out, retval] BOOL* pVal | Detaches currently defined object of specified type. Has no effect if no universe is currently defined. Indicates whether the universe was detached. If not, an explanation is provided. |
| IsConnectAllowed | [in] BSTR ParentObjectID, [in] long ChildObjectID, [out] BSTR* pExplanation, [out, retval] BOOL* pVal | Indicates whether a connection is allowed between the two objects whose ID's are specified. If not allowed, then an explanation is provided. |
| IsConnectAllowed | [in] IDispatch* pParentObject, [in] IDispatch* pChildObject, [[out] BSTR* pExplanation, [out, retval] BOOL* pVal | Indicates whether a connection is allowed between the two objects whose dispatch interfaces are specified. If not allowed, then an explanation is provided. |
| IsconnectClean | [in] BSTR ParentObjectID, [in] BSTR ChildObjectID, [out] BSTR* pExplanation, [out, retval] BOOL* pVal | Indicates whether a connection is "clean" between the two objects whose ID's are specified. A connection may be allowed, but not be "clean". Application informs the caller where a potential problem might exist should the user add the connection. |
| IsConnectClean | [in] IDispatch* pParentObject, [in] IDispatch* pChildObject, [out] BSTR* pExplanation, [out, retval] BOOL* pVal | Indicates whether a connection is "clean" between the two objects specified. A connection may be allowed, but not be "clean". Application informs the caller where a potential problem might exist should the user add the connection. |
| Save | [out] BSTR* pExplanation, [out, retval} BOOL* pVal | Indicates whether a save completed successfully. Application provides an explanation to the caller when a problem exists with the attempt to save. |
| SaveAs | [in] BSTR strNewName, [out] BSTR* pExplanation, [out, retval] BOOL* pVal | Caller provides a new name for the campaign copy. The new name must be distinct within the campaign name space. Indicates whether a copy completed successfully. Application provides an explanation to the caller when a problem exists with the attempt to copy. |
| ScheduleExport | [out] BSTR* pExplanation, [out, retval] BOOL* pVal | This method lets the caller ask that the campaign be exported. Returns TRUE if the calls succeeds. If call is not successful, then an explanation is provided. Client should only call this if ad hoc exports are permitted. |
| ScheduleOnceNow | [in] VT_DISPATCH collection, [out] BSTR* pExplanation, [out, retval] BOOL* pVal | Allows the client to schedule one or more components for execution such that the request will be executed as soon as possible. Caller provides a collection object to be which has one or more component of some type. All members of the collection are required to be of the same type. |

TABLE 2-continued

| Name | Parameters - IDL | Description |
| --- | --- | --- |
| | | The type of the request is inferred from the type associated with collection members.<br>For example, a contact can only be counted, an extract can only be executed to cause extraction. All other types are not supported except these two.<br>Returns TRUE if the call succeeds. If call is not successful, then an explanation is provided. |
| ScheduleOnceLater | [in] VT_DISPATCH collection,<br>[in] VT_DATE,<br>[out] BSTR* pExplanation,<br>[out, retval] BOOL* pVal | Allows the client to schedule one or more components for execution such that the request will be executed on or about the specified time according to standard application request dispatching rules.<br>Caller provides a collection object to be which has one or more components of some type. All members of the collection are required to be of the same type.<br>The type of the request is inferred from the type associated with collection members.<br>For example, a contact can only be counted, an extract can only be executed to cause extraction. All other types are not supported except these two.<br>Returns TRUE if the call succeeds. If call is not successful, then an explanation is provided. |
| ScheduleForBatch | [in]VT_DISPATCH collection,<br>[in] VT-BSTR strBatchName,<br>[out] BSTR* pExplanation,<br>[out, retval] BOOL* pVal | Allows the client to schedule one or more components for execution such that the request will be executed as part of the specified named batch.<br>Caller provides a collection object to be which has one or more components of some type. All members of the collection are required to be of the same type.<br>The type of the request is inferred from the type associated with collection members.<br>For example, a contact can only be counted, an extract can only be executed to cause extraction. All other types are not supported except these two.<br>Returns TRUE if the call succeeds. If call is not successful, then an explanation is provided. |
| ScheduleMoreThanOnce | [in] VT_DISPATCH collection,<br>[in] VT-BSTR strScheduleName,<br>[out] BSTR* pExplanation,<br>[out, retval] BOOL* pVal | Allows the client to schedule one or more components for execution according to some named schedule of execution.<br>Caller provides a collection object to be which has one or more components of some type. All members of the collection are required to be of the same type.<br>The type of the request is inferred from the type associated with collection members.<br>For example, a contact can only be counted, an extract can only be executed to cause extraction. All other types are not supported except these two.<br>Returns TRUE if the call succeeds. If call is not successful, then an explanation is provided. |

A component object may include information about various transformers, for example a contact, a dedupe, split method, offer cell, extract, or split operation. The "component" object shown as a simple block in FIG. 14A is shown in greater detail in FIG. 14B. The component object may for example, have 0-N children and 0-N parents and may be part of the campaign and therefore, connected to the campaign object. Table 3 below illustrates an example of some of the properties that may be included in the component object.

TABLE 3

| Name | Access | Type | Description |
|---|---|---|---|
| ObjectID | R/O | VT_BSTR | Unique object identifier for this object. |
| Author | R/O | VT_BSTR | Name of user who created the object originally. |
| Description | R/W | VT_BSTR | Description of the object. |
| Name | R/W | VT_BSTR | Name of the campaign component. |
| TimeLastUpdate | R/O | VT_DATE | Date/time of the last update made to the object. |
| UserLastUpdate | R/O | VT_BSTR | Name of the user who last updated the object. |
| TimeCreation | R/O | VT_DATE | Date/time of the creation of the object. |
| Parents | R/O | VT_DISPATCH | [read-only Collection of Component ]. |
| Children | R/O | VT_DISPATCH | [read-only Collection of Component ]. |
| ObjectType | R/O | VT_I2 | Object type of the component. |
| IsLocked | R/O | VT_BOOL | Indicates whether the campaign is in a read-only state. |
| IsModified | R/O | VT_BOOL | Indicates whether the campaign has been modified since last save, or since open. |
| Campaign | R/O | VT_DISPATCH | Backwards reference to the campaign in which this component is defined. Back-references are used by plug-ins to navigate from the plug-in host out to the larger business object realm. |
| Schedules | R/O | VT_DISPATCH | Set of schedule for this component. |

As illustrated in FIG. 14A, a campaign object may also include a connection object which defines the relationship between child and parent items or components. The connection object may include a reference to the parent and child components as they relate in the campaign. Attach and detach functions may be used to either attach a parent or child object as one associated with the specified object ID or detach the currently defined parent or child.

Figure 14C:
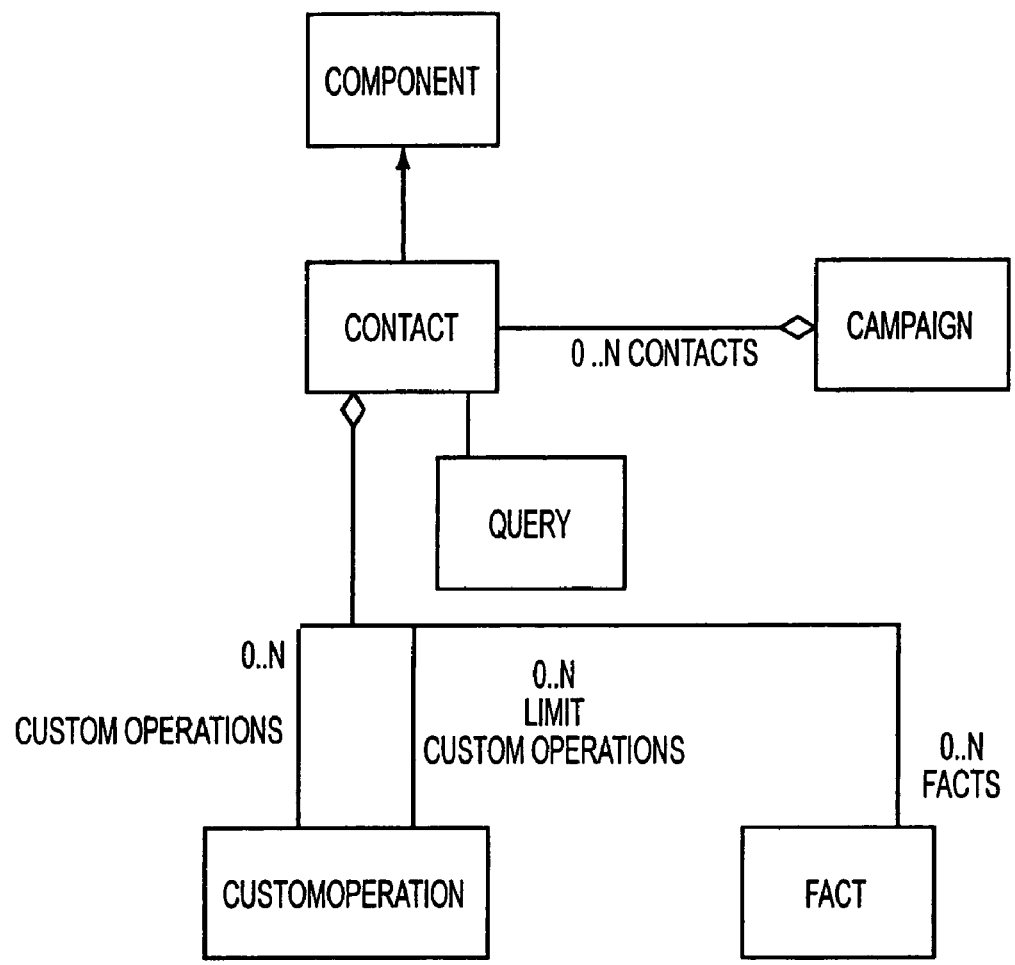
FIG. 14C illustrates one example of a contact object model.
Figure 14D:
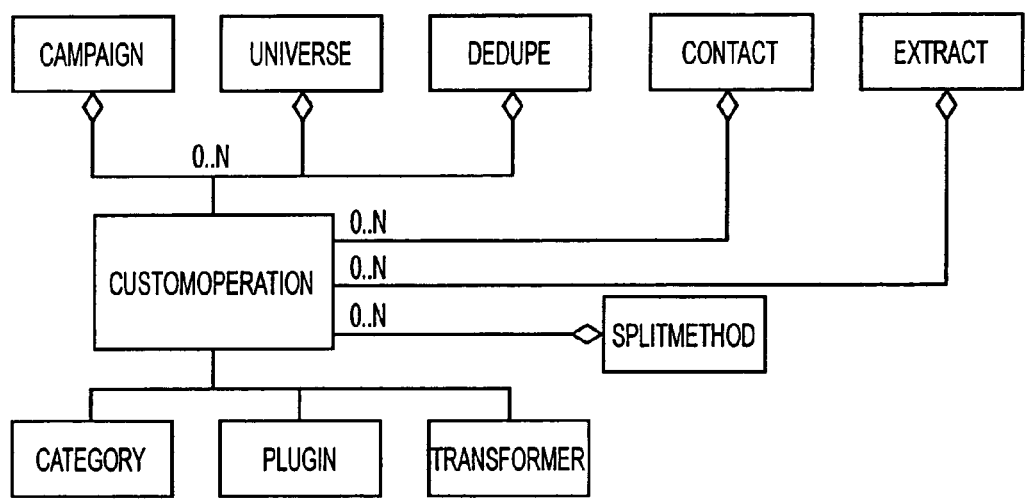
FIG. 14D illustrates one example of a custom operation object model.

A "component" object as shown in FIG. 14A, may include a "contact group" object (or "query" object) as shown in greater detail in FIG. 14C. The object may include a tracking code of the object. A query property may be used to select membership for the contact group, and may have the ability for the query object to be attached or detached from the contact object. A maximum limit may be used to define a maximum number of contacts for the contact object and the contact object may include a connection to a custom operation (e.g., plug-in). The custom operation may include a query custom operation or a limit custom operation as shown in FIG. 14C.

Like the contact (or query) object described above, other object types may be associated with the other basic commands in the campaign.

An extract object may be used to extract information into a particular format, for example, into a file or a table. The extract may be related to a custom operation and may have, for example, either a file or a table as a target. An extract policies object may include policies which define whether or not a campaign extract is allowed to run more than once. The extract policies object may also include policies defining whether the campaign locks and all campaign components upon which it depends locks, once the extract has successfully executed.

A transformer such as a splitter may have a splitter object model (not shown) which represents a specific split. The splitter object may include properties such as a unique identifier for the object and the size of the split, i.e., either an exact amount or a percentage. A campaign may also include a universe object (not shown) which may specify the complete set of data against which a campaign will be run. A query object may be attached to the universe or a custom operation object may also be included and attached to the universe object. By using a query or a customized query operation, a user may select a subsegment of customers to be used in a campaign.

Custom operations may be attached or detached from the contact object (or other objects which correspond to operations such as dedupe, split, etc.) as the manner for configuring the custom operation into the campaign.

As discussed above, a custom operation may be used to introduce a plug-in component to a particular object and may be shown as a user interface to the user. Or, the custom operation may supply behavior at a particular point in processing such as the preprocessing, postprocessing or override functions. Some of the properties which may be used in one example to define a custom operation object are shown below in Table 4.

TABLE 4

| Name | Access | Type | Description |
|---|---|---|---|
| ObjectID | R/O | VT_BSTR | Unique object identifier for this object. |
| ObjectType | R/W | VT_I4 | Type of the object to which the CustomOperation applies. |
| Role | R/W | VT_I2 | Enumeration off computational roles. |
| Transformer | R/W | VT_BSTR | Unique name of the transformer if the CustomOperation specifies one. |
| Plug-in | R/W | VT_BSTR | Unique name of the plug-in if the CustomOperation specifies one. |
| Category | R/W | VT_BSTR | If a plug-in is associated with this operation, then if it |

TABLE 4-continued

| Name | Access | Type | Description |
| --- | --- | --- | --- |
| | | | is a "custom UI fragment", then it has a user-defined category under which it appears when presented through the UI. If a plug-in and transformer both are defined, then the category is a built-in category. |

If a plug-in is associated with the custom operation, then the custom operation may appear on the user interface to the user. A category object shown in FIG. 14D as being associated with the custom operation object and may define where the custom operation appears as being available to users through the user interface. Tabs "Reports" and "Selection Help" may be based on two like-named categories in FIG. 12A. The category object may also define whether the custom operation is a transformer which is related to a server-side computation and which has an application defined category associated with it.

A fact object may be defined for a variety of objects such as a campaign, a contact, extract or an offer cell. The fact object may include information as to the date and time of the creation of the fact, an amount associated with the fact, such as an amount of contacts and may also include an owner of the fact, a creator of the fact and an object identifier for the fact object. Further, a parameter may indicate whether the fact is current or obsolete.

A file target object may be related to an extract object and may specify where an output should be written. Properties in the file object may define the number of fields, rows, strings, and type of file that is to be used. A format object related to an extract object may define which fields should be provided is an output.

Figure 14E:
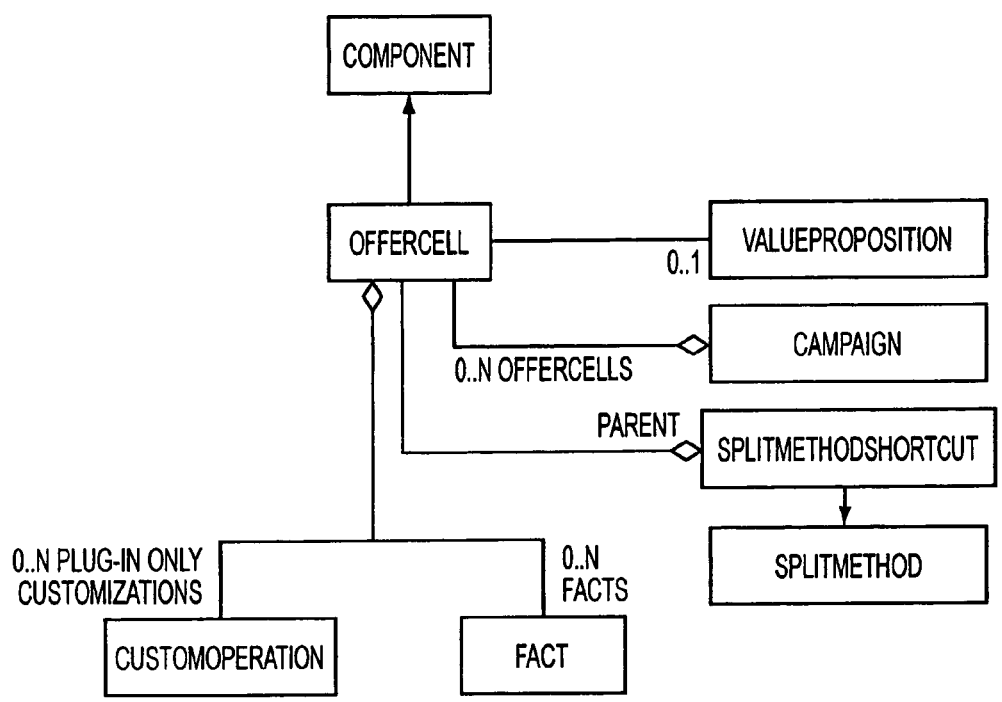
FIG. 14E illustrates one example of an offer cell object model.

FIG. 14E is a representation of an offer cell object which may have properties which are the same as those of the component object discussed above in respect to FIG. 14B.

A request object (not shown) may be used to report on a request that is associated with a given campaign. The request object may include properties such as the name of the user who scheduled the request, the object identification of the current campaign, the name of the components associated with the request, the type of request, the status of the request and the result of the request.

A schedule object (not shown) may include properties which indicate the start time of a particular campaign and the schedule object may include other properties as well.

The objects defined above may be represented in a variety of formats and may include other properties that are not listed herein. The objects may be used to expose properties and methods through interfaces so that they are accessible by, for example, plug-in components and transformers. These objects are listed as only one example of implementing a campaign. Other objects and other representations may also be used.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

The invention claimed is:

1. A method of customizing a marketing campaign system running on a computer system, the method comprising:
   providing a client-side plug-in component;
   providing a server-side plug-in component, wherein a reference to at least one of the client-side plug-in component and the server-side plug-in component is included in a campaign object for a marketing campaign, wherein the campaign object is capable of being saved, recalled, and edited;
   associating the client-side plug-in component with the server-side plug-in component;
   operating the server-side plug-in component in response to the client-side plug-in component, wherein the operating comprises communicating between the server-side plug-in component and the client-side plug-in component by persisting properties, wherein the persisting properties include at least one property whose value and contextual information may be written to and read from a persistent storage medium, where the contextual information includes a name of an item for which the property is an attribute;
   associating the server-side plug-in component with an operation of a marketing campaign system; and
   configuring the server-side plug-in component into the campaign object using an interface associated with the operation;
   wherein the server-side plug-in component is classified during one of a time of creation or a time of configuration as performing pre-processing, post-processing or override processing.

2. The method of claim 1, further comprising: building the campaign object.

3. The method of claim 2, further comprising identifying whether the server-side plug-in component performs the pre-processing, the post-processing or the override processing.

4. The method of claim 1, wherein: the computer system comprises a client machine and a server machine; and the method further comprises:
   executing the client-side plug-in component on the client machine; and
   executing the server-side plug-in component on the server machine.

5. The method of claim 1, wherein the client-side plug-in component allows information to be input, and the server-side plug-in component performs selection of customer records in a database based on the input information.

6. The method of claim 1, wherein the client-side plug-in component communicates a request, and a dispatcher forwards the request to the server-side plug-in component according to at least one rule.

7. The method of claim 6, wherein the at least one rule is utilized to determine the server-side plug-in component from a plurality of server-side plug-in components for handling a request.

8. A customizable marketing campaign system having at least a processor, comprising:
   means for associating a client-side plug-in component with a server-side plug-in component, wherein a reference to at least one of the client-side plug-in component and the server-side plug-in component is included in a campaign object for a marketing campaign, wherein the campaign object is capable of being saved, recalled, and edited;
   means for operating the server-side plug-in component in response to the client-side plug-in component, wherein the operating comprises communicating between the server-side plug-in component and the client-side plug-in component by persisting properties, wherein the persisting properties include at least one property whose value and contextual information may be written to and read from a persistent storage medium, where the contextual information includes a name of an item for which the property is an attribute;

means for associating the server-side plug-in component with an operation of a marketing campaign system; and means for configuring the server-side plug-in component into the campaign object using an interface associated with the operation;

wherein the server-side plug-in component is classified during one of a time of creation or a time of configuration as performing pre-processing, post-processing or override processing.

9. A method of customizing a marketing campaign system running on a computer system, the method comprising:

providing a client-side plug-in component;

providing a server-side plug-in component, wherein a reference to at least one of the client-side plug-in component and the server-side plug-in component is included in a campaign object for a marketing campaign, wherein the campaign object is capable of being saved, recalled, and edited;

communicating between the client-side plug-in component and the server-side plug-in component using persisting properties, wherein the persisting properties include at least one property whose value and contextual information may be written to and read from a persistent storage medium, where the contextual information includes a name of an item for which the property is an attribute;

associating the server-side plug-in component with an operation of a marketing campaign system; and configuring the server-side plug-in component into the campaign object using an interface associated with the operation;

wherein the server-side plug-in component is classified during one of a time of creation or a time of configuration as performing pre-processing, post-processing or override processing.

10. The method of claim 9, wherein: the computer system comprises a client machine and a server machine; and the method further comprises:

executing the client-side plug-in component on the client machine; and executing the server-side plug-in component on the server machine.

11. The method of claim 9, further comprising identifying whether the server-side plug-in component performs the pre-processing, the post-processing or the override processing.

12. The method of claim 9, further comprising:
building the campaign object.

13. A method of customizing a marketing campaign application running on a computer system, the method comprising:

providing a client-side plug-in component;

providing a server-side plug-in component, wherein a reference to at least one of the client-side plug-in component and the server-side plug-in component is included in a campaign object for a marketing campaign, wherein the campaign object is capable of being saved, recalled, and edited;

configuring the client-side plug-in component into the application;

configuring the server-side plug-in component into the application;

communicating between the client-side plug-in component and the sewer-side plug-in component by persistent properties, wherein the persisting properties include at least one property whose value and contextual information may be written to and read from a persistent storage medium, where the contextual information includes a name of an item for which the property is an attribute;

associating the server-side plug-in component with an operation of a marketing campaign system; and configuring the server-side plug-in component into the campaign object using an interface associated with the operation;

wherein the sewer-side plug-in component is classified during one of a time of creation or a time of configuration as performing pre-processing, post-processing or override processing.

14. The method of claim 13, wherein:
the computer system comprises a client machine and a server machine; and the method further comprises:

executing the client-side plug-in component on the client machine; and executing the server-side plug-in component on the server machine.

15. A computer readable media including code executable by a processor for customizing a marketing campaign system, the computer readable media comprising:

a client-side plug-in component stored on the readable media, the client-side plug-in component being adapted to communicate with a server-side plug-in component using persisting properties, wherein the persisting properties include at least one property whose value and contextual information may be written to and read from a persistent storage medium, where the contextual information includes a name of an item for which the property is an attribute;

wherein a reference to at least one of the client-side plug-in component and the server-side plug-in component is included in a campaign object for a marketing campaign, wherein the campaign object is capable of being saved, recalled, and edited;

wherein the server-side plug-in component is associated with an operation of a marketing campaign system;

wherein the server-side plug-in component is configured into the campaign object using an interface associated with the operation;

wherein the server-side plug-in component is classified during one of a time of creation or a time of configuration as performing pre-processing, post-processing or override processing.

16. A computer readable media including code executable by a processor for customizing a marketing campaign system, the computer readable media comprising:

a server-side plug-in component stored on the readable-media, the server-side plug-in component being adapted to operate in response to data provided by a client-side plug-in component;

wherein a reference to at least one of the client-side plug-in component and the server-side plug-in component is included in a campaign object for a marketing campaign, wherein the campaign object is capable of being saved, recalled, and edited;

wherein the server-side plug-in component and the client-side plug-in component communicate by persisting properties, wherein the persisting properties include at least one property whose value and contextual information may be written to and read from a persistent storage medium, where the contextual information includes a name of an item for which the property is an attribute;

wherein the server-side plug-in component is associated with an operation of a marketing campaign system;

wherein the server-side plug-in component is configured into the campaign object using an interface associated with the operation;

wherein the server-side plug-in component is classified during one of a time of creation or a time of configuration as performing pre-processing, post-processing or override processing.

17. The computer readable media of claim 16, wherein the server-side plug-in component includes a specification of an association with the operation of an original marketing campaign system.

18. A computer readable media of claim 17, wherein the specification includes a designation specifying a function selected from the group consisting of the pre-processing, the post-processing and the override processing.

* * * * *

UNITED STATES PATENT AND TRADEMARK OFFICE
CERTIFICATE OF CORRECTION

| | | |
|---|---|---|
| PATENT NO. | : 7,523,466 B2 | Page 1 of 1 |
| APPLICATION NO. | : 10/855009 | |
| DATED | : April 21, 2009 | |
| INVENTOR(S) | : Matthew J. DeAngelis | |

It is certified that error appears in the above-identified patent and that said Letters Patent is hereby corrected as shown below:

Col. 4, line 30, please replace "interlace" with -- interface --;
Col. 10, line 21, please replace "L" with -- a --;
Col. 11, line 46, please replace "And/or" with -- and/or --;
Col. 12, line 6, please replace "plug-n" with -- plug-in --;
Col. 15, line 25, please replace "alter" with -- after --;
Col. 15, line 31, please replace "preprocessing" with -- pre-processing --;
Col. 15, line 54, please replace "preprocessing" with -- pre-processing --;
Col. 20, line 54, please replace "71a" with -- 71 --;
Col. 21, line 55, please insert -- to -- before "the" and after "display";
Col. 37, line 39, please replace "is" with -- as --.
Col. 40, line 4, please replace "sewer-side" with -- server-side --;
Col. 40, line 15, please replace "sewer-side" with -- server-side --.

Signed and Sealed this

Third Day of May, 2011

David J. Kappos
*Director of the United States Patent and Trademark Office*